US012573266B2

(12) United States Patent
John et al.

(10) Patent No.: US 12,573,266 B2
(45) Date of Patent: Mar. 10, 2026

(54) COMPUTER GAMING SYSTEMS AND METHODS FOR ESTABLISHING SYMBIOTIC OBJECTIVES

(71) Applicant: Truist Bank, Charlotte, NC (US)

(72) Inventors: Michael Taylor John, San Francisco, CA (US); Noah Jeffrey Joyce, Atlanta, GA (US)

(73) Assignee: TRUIST BANK, Charlotte, NC (US)

( * ) Notice: Subject to any disclaimer, the term of this patent is extended or adjusted under 35 U.S.C. 154(b) by 267 days.

(21) Appl. No.: 18/475,361

(22) Filed: Sep. 27, 2023

(65) Prior Publication Data

US 2025/0104517 A1 Mar. 27, 2025

(51) Int. Cl.
*G07F 17/32* (2006.01)

(52) U.S. Cl.
CPC ...... *G07F 17/3255* (2013.01); *G07F 17/3225* (2013.01); *G07F 17/3262* (2013.01)

(58) Field of Classification Search
CPC ............. G07F 17/3255; G07F 17/3225; G07F 17/3262; G07F 17/3244
USPC ............................................................ 463/25
See application file for complete search history.

(56) References Cited

U.S. PATENT DOCUMENTS

| | | | | |
|---|---|---|---|---|
| 8,608,536 B2 * | 12/2013 | Van Luchene | G07F 17/3281 463/31 |
| 2008/0200253 A1 * | 8/2008 | Van Luchene | G07F 17/3232 463/42 |
| 2010/0257048 A1 | 10/2010 | Tittel | |
| 2010/0257084 A1 | 10/2010 | Tittel | |
| 2014/0106883 A1 * | 4/2014 | Van Luchene | G07F 17/3244 463/31 |
| 2016/0089606 A1 | 3/2016 | Javed Lal Mohammed Ameerjan | |
| 2020/0258158 A1 | 8/2020 | Gilliam | |
| 2023/0025773 A1 | 1/2023 | Niemela | |
| 2023/0126190 A1 | 4/2023 | Faleti | |
| 2025/0111741 A1 * | 4/2025 | John | G07F 17/3241 |

* cited by examiner

*Primary Examiner* — Pierre E Elisca
(74) *Attorney, Agent, or Firm* — Michael A. Springs, Esq.; Shumaker, Loop & Kendrick, LLP; Patrick B. Horne

(57) ABSTRACT

Systems and methods for establishing and achieving objectives that benefit a user and an entity include at least one processor that determines that a user has created, via a user device, a gaming profile associated with an entity. The processor displays one or more user objectives via the user device and receives a user selection of at least one user objective from the one or more user objectives. A gaming action is created that is capable of being performed via the user device that would permit a user to achieve the at least one user device. After receiving an indication from the user device that the user has achieved the at least one user device, a digital remuneration is transmitted to the user's gaming profile in an amount correlated to the at least one user objective achieved by the user.

20 Claims, 12 Drawing Sheets

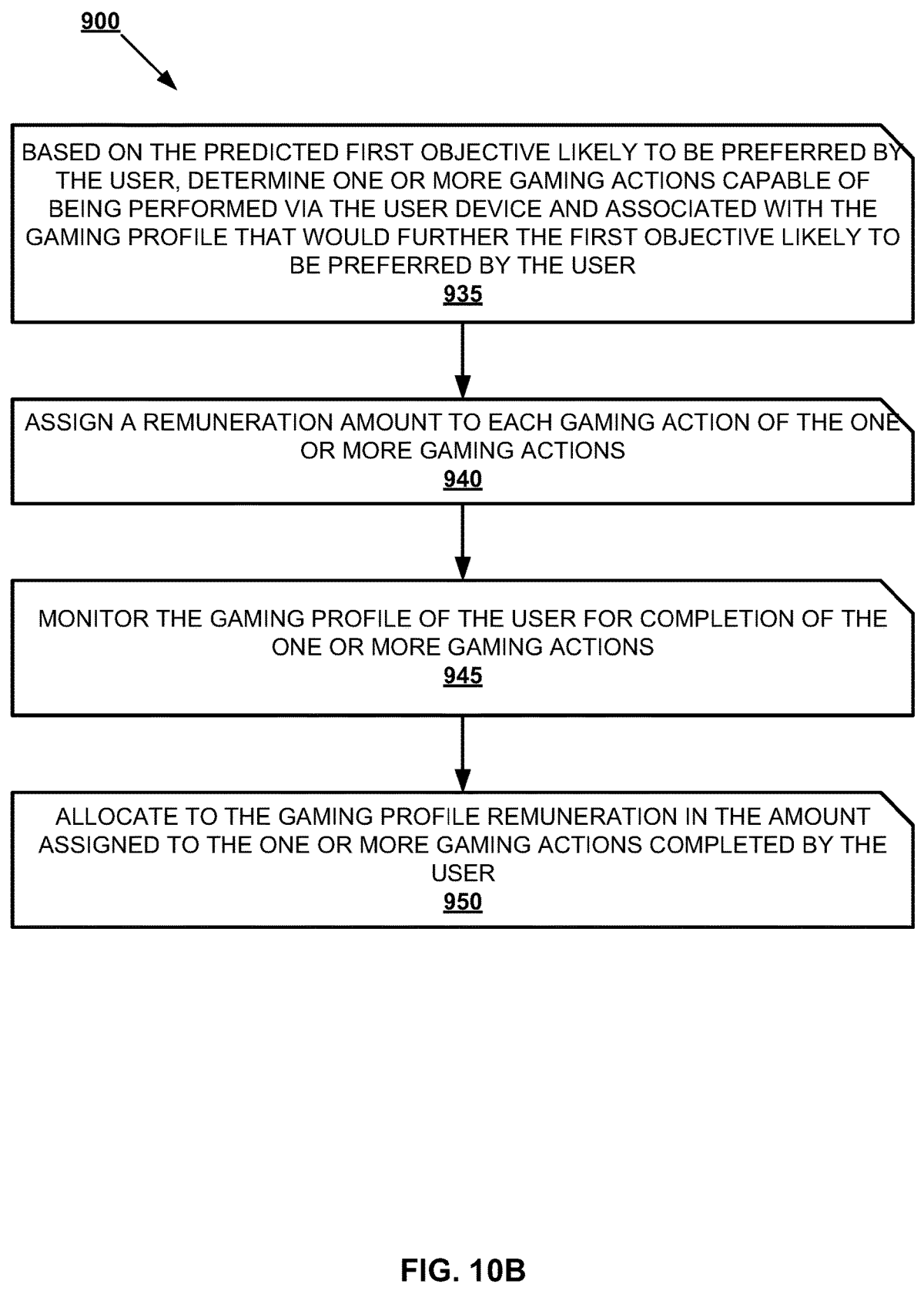

900

BASED ON THE PREDICTED FIRST OBJECTIVE LIKELY TO BE PREFERRED BY THE USER, DETERMINE ONE OR MORE GAMING ACTIONS CAPABLE OF BEING PERFORMED VIA THE USER DEVICE AND ASSOCIATED WITH THE GAMING PROFILE THAT WOULD FURTHER THE FIRST OBJECTIVE LIKELY TO BE PREFERRED BY THE USER
935

ASSIGN A REMUNERATION AMOUNT TO EACH GAMING ACTION OF THE ONE OR MORE GAMING ACTIONS
940

MONITOR THE GAMING PROFILE OF THE USER FOR COMPLETION OF THE ONE OR MORE GAMING ACTIONS
945

ALLOCATE TO THE GAMING PROFILE REMUNERATION IN THE AMOUNT ASSIGNED TO THE ONE OR MORE GAMING ACTIONS COMPLETED BY THE USER
950

FIG. 10B

COMPUTER GAMING SYSTEMS AND METHODS FOR ESTABLISHING SYMBIOTIC OBJECTIVES

FIELD OF THE INVENTION

This invention relates generally to the field of computer gaming, and more particularly embodiments of the invention relate to computer gaming systems and methods for achieving objectives, whether they are user-related objectives or entity-related objectives.

BACKGROUND OF THE INVENTION

Video games can be powerful tools for learning. They can enhance problem-solving, critical thinking, and strategic planning skills. Educational gaming systems are designed specifically to teach users various subjects like math, language, and science in an engaging and entertaining way. Some video games even allow a user to earn currency that may be usable in the game, for example, to upgrade their avatar's look or possessions. Other computer gaming systems are solely for entertainment and, some may argue, lead to poor social skills and time away from family, school work, and other hobbies, thereby hindering education. Traditionally, educational video games have been limited to more remedial education, leaving an opening for more, well-rounded educational opportunities in gaming—online or through a gaming console—that teach real-life skills such as those taught in a traditional, in-person home economics classes (i.e., cooking, sewing, child care, and budgeting). Thus, a need exists for improved video game development that addresses these shortcomings.

BRIEF SUMMARY

Shortcomings of the prior art are overcome and additional advantages are provided through the provision of a computer gaming system for achieving objectives. The computing system includes at least one processor, a communication interface communicatively coupled to the at least one processor, and a memory device storing executable code that, when executed, causes the at least one processor to, in part, determine that a user has created, via a user device, a gaming profile associated with an entity. The processor displays one or more objectives via the user device and receives, also via the user device, a selection of at least one user objective from the one or more user objectives. In response to receiving the user selection, the system creates a gaming action capable of being performed via the user device that would permit a user to achieve the at least one user objective. The system receives an indication from the user device that the user has achieved or completed the at least one user objective and transmits to the gaming profile a digital remuneration in an amount correlated to the at least one user objective achieved by the user.

Additionally, disclosed herein is a computer system for assisting a user with achieving a goal via a computer game. The computing system includes at least one processor, a communication interface communicatively coupled to the at least one processor, and a memory device storing executable code that, when executed, causes the at least one processor to, in part, In some embodiments, the one or more user objectives are one or more universal objectives correlated to one or more basic financial skills. The one or more basic financial skills include at least one of saving, purchasing, retiring, increasing credit score, and funding for an emergency.

In particular embodiments, the one or more user objectives include a selection of predetermined objectives.

In some embodiments, the one or more user objectives include at least one custom user objective received from the user device and input by the user.

In particular embodiments, the one or more user objectives include a goal that is mutually beneficial to the user and to the entity. For example, a mutually beneficial goal includes at least one of increasing user savings, increasing user engagement, promoting cross-selling with partner entities, promoting fiscal learning, borrowing facility initiation, and increasing user retention.

In various embodiments, the at least one user objective includes a series of steps such that, when the system receives an indication from the user device that the user has completed each of the series of steps, the system receives an indication from the user device that the user has achieved the at least one user objective.

Also disclosed herein is a computer-implemented method for establishing and achieving objectives via a computer gaming system. The method includes: (1) determining that a user has created, via a user device, a gaming profile associated with an entity; (2) displaying one or more user objectives via the user device; (3) receiving, via the user device, a user selection of at least one user device from the one or more user objectives; (4) creating action capable of being performed via the user device that would permit a user to achieve the at least one user objective; (5) receiving an indication from the user device that the user has achieved the at least one user device; and (6) transmitting to the gaming profile a digital remuneration in an amount correlated to the at least one user objective achieved by the user.

Further disclosed herein is a computer system for establishing and achieving objectives via a gaming software application. The computer system includes at least one processor, a communication interface communicatively coupled to the at least one processor, and a memory device storing executable code that, when executed, causes the processor to receive, via a user device, a user gaming profile of a user for the gaming software application, where the gaming software application is associated with an entity. The system transmits, via the user device, a first user objective and a second user objective to the user. In response, the system receives, via the user device, a user selection of at least one of the first user objective and the second user objective. The system then creates a set of gaming actions capable of being performed via the user device that would permit a user to achieve at least one of the first user objective and the second user objective. The system tracks the user's progress towards performing the set of gaming actions and, once the system determines that the user has completed performance of the set of gaming actions, the system transmits to the user gaming profile a digital remuneration in an amount correlated to at least one of the first user objective and the second user objective.

Additionally disclosed herein is a computer gaming system for establishing and achieving objectives, the computer system including at least one processor, a communication interface communicatively coupled to the at least one processor, and a memory device storing executable code. The executable code, when executed, causes the processor to determine that a user has accessed, via a user device, a gaming profile associated with an entity. The system transmits to the user, via the user device, a digital communication, where the digital communication includes one or more questions or queries for determining a preferred objective of the user. At least partially in response, the system receives, from the user device, one or more user inputs and derives from the one or more user inputs the user's preferred objective. The system then determines one or more gaming actions capable of being performed via the user device and associated with the user's preferred objective that would further the user's preferred objective. The system store's the user's preferred objective in an entity data source, where the entity data source also stores data corresponding to a user profile for the user. The processor determines that the user has accessed, via the user device, the gaming profile of the gaming software application associated with the entity, monitors the gaming profile of the user for completion of the one or more gaming actions, and allocates to the gaming profile remuneration in an amount correlated to the user's preferred objective.

In some embodiments, the user's preferred objective is at least one of saving, purchasing, retiring, increasing credit score, and funding for an emergency.

In some embodiments, the user's preferred objective is a goal that is mutually beneficial to the user and to the entity.

In some embodiments, the mutually beneficial goal is at least one of increasing user savings, increasing user engagement, promoting cross-selling with partner entities, promoting fiscal learning, borrowing facility initiation, and increasing user retention.

In some embodiments, the user's preferred objective includes a series of steps to complete the one or more gaming actions.

In some embodiments, when the system monitors the gaming profile of the user for completion of the one or more gaming actions, the system receives an indication from the user device that the user has completed each of the series of steps and determines that the user has achieved the user's preferred objective.

According to example embodiments, a computer system is disclosed herein for establishing and achieving objectives via a software application, where the system includes at least one processor, a communication interface communicatively coupled to the at least one processor, and a memory device storing executable code that, when executed, causes the at least one processor to, in part, determine that a user has accessed, via a user device, a gaming profile associated with an entity. The system transmits to the user, via the user device, a digital communication that includes one or more queries for determining a preferred objective of the user. The system receives, from the user device, one or more user inputs in response to the one or more queries and derives, at least partially based on decision tree analysis, the user's preferred objective. Based on the user's derived preferred objective, the system determines one or more gaming actions capable of being performed via the user device and associated with the user's preferred objective that would further the user's preferred objective. The system stores the user's preferred objective in an entity data source that also stores user data corresponding to a user profile associated with the user. The system then determines that the user has accessed, via the user device, the gaming profile of the gaming software application associated with the entity and monitors the gaming profile of the user for completion of the one or more gaming actions, where the one or more gaming actions include a series of steps for the user to complete to achieve the user's preferred objective. Once the series of steps are completed, the system allocates to the gaming profile remuneration in an amount correlated to the user's preferred objective.

In some embodiments, the digital communication is at least one of a query, question, inquiry, and survey.

In some embodiments, the decision tree analysis is configured to prioritize a preferred objective of the user that furthers one or more objectives of the entity.

In some embodiments, the series of steps to complete the user's preferred objective includes a first step and a second step, wherein the second step has a high correlated remuneration amount than the first step.

According to various embodiments, a computer-implemented method is disclosed for establishing and achieving objectives via a gaming software application. The method includes: (1) determining that a user has accessed, via a user device, a gaming profile associated with an entity; (2) transmitting to the user, via the user device, a digital communication, wherein the digital communication includes one or more queries for determining a preferred objective of the user; (3) receiving, from the user device, one or more user inputs in response to the one or more queries; (4) deriving, at least partially based on the one or more inputs, the user's preferred objective; (5) determining one or more gaming actions capable of being performed via the user device and associated with the user's preferred objective that would further the user's preferred objective; (6) storing the user's preferred objective in an entity database or data source; (7) determining that the user has accessed, via the user device, the gaming profile of the gaming software application associated with the entity; (8) monitoring the gaming profile of the user for completion of the one or more gaming actions; and (9) allocating to the gaming profile remuneration in an amount correlated to the user's preferred objective.

Example embodiments disclosed herein include a gaming system for establishing and achieving objectives. The system includes at least one processor, a communication interface communicatively coupled to the at least one processor, and a memory device storing executable code that, when executed, causes the at least one processor to, in part, receive, via a user device, user input requesting access to a gaming profile associated with an entity. The system receives entity data from the user's gaming profile and collects entity data from a plurality of user profiles associated with an entity. The system extracts resource data from the entity data for the user and the plurality of users. In response to extracting the resource data, the system predicts, based on a machine learning dataset and the extracted resource data, a first objective likely to be preferred by the user. Based on the predicted first objective likely to be preferred by the user, the system determines one or more gaming actions capable of being performed via the user device and associated with the gaming profile that would further the first objective likely to be preferred by the user and assigns a remuneration amount to each gaming action. The system monitors the gaming profile of the user for completion of the one or more gaming actions, and allocates to the gaming profile remuneration in the amount assigned to the one or more gaming actions completed by the user.

In some embodiments, the machine learning dataset is generated based on data collected from a plurality of sources. In particular, the plurality of sources may include an entity data source that includes historical data associated with the user's prior interactions with the gaming system.

In some embodiments, the executable code, when executed, causes the processor, in response to extracting the resource data, to predict, based on the machine learning dataset and the extracted resource data, a second objective likely to be preferred by the entity. In such instances, the system determines one or more gaming actions capable of being performed via the user device and associated with the gaming profile that would further the second objective likely to be preferred by the entity.

A computer-implemented method is also disclosed for establishing and achieving objectives via a gaming software application. The method includes: (1) receiving, via a user device, user input requesting access to a gaming profile associated with an entity; (2) receiving entity data from the user's gaming profile; (3) collecting entity data from a plurality of user profiles associated with an entity; (4) extracting resource data from the entity data for the user and the plurality of users; (5) in response to extracting the resource data, predicting, based on a machine learning dataset and the extracted resource data, a first objective likely to be preferred by the user; (6) based on the predicted first objective likely to be preferred by the user, determining one or more gaming actions capable of being performed via the user device and associated with the gaming profile that would further the first objective likely to be preferred by the user; (7) assigning a remuneration amount to each gaming action of the one or more gaming actions; (8) monitoring the gaming profile of the user for completion of the one or more gaming actions; and (9) allocating to the gaming profile remuneration in the amount assigned to the one or more gaming actions completed by the user.

Example embodiments disclosed herein further include a computer system for establishing and achieving objectives via a gaming software application, the system including at least one processor, a communication interface communicatively coupled to the at least one processor, and a memory device storing executable code that, when executed, causes the at least one processor to, in part, receive, via a user device, user input requesting access to a gaming profile associated with an entity. The system receives entity data from the user's gaming profile and collects entity data from a plurality of user profiles associated with an entity. The system extracts resource data from the entity data for the user and the plurality of users. In response, the system predicts, based on a machine learning dataset and the extracted resource data, a first objective likely to be preferred by the entity. Based on the predicted first objective likely to be preferred by the entity, the system determines one or more gaming actions capable of being performed via the user device and associated with the gaming profile that would further the first objective likely to be preferred by the entity. The system then assigns a remuneration amount to each gaming action of the one or more gaming actions, monitors the gaming profile of the user for completion of the one or more gaming actions, and allocates to the gaming profile remuneration in the amount assigned to the one or more gaming actions completed by the user.

In some embodiments, the system predicts, based on the machine learning dataset and the extracted resource data, a second objective likely to be preferred by the user and determines one or more gaming actions capable of being performed by the user device and associated with the gaming profile that would further the second objective likely to be preferred by the user.

In some embodiments, the system displays, via the user device, the first objective likely to be preferred by the entity, the second objective likely to be preferred by the user, and receives a user selection of at least one of the first objective and the second objective.

According to example embodiments, also disclosed herein is a computer gaming system for establishing and achieving objectives, the computer system having at least one processor, a communication interface communicatively coupled to the at least one processor, and a memory device storing executable code that, when executed, causes the processor to determine that a user has accessed, via a user device, a gaming profile associated with an entity. The system transmits to the user, via the user device, a digital communication, wherein the digital communication comprises one or more queries for determining a preferred objective of the user. The system receives, from the user device, one or more user inputs in response to the one or more queries and derives, at least partially based on the one or more inputs, the user's preferred objective. The system then determines one or more gaming actions capable of being performed via the user device and associated with the user's preferred objective that would further the user's preferred objective. Next, the system stores the user's preferred objective in an entity data source, wherein the entity data source stores user data corresponding to a user profile of the user. The system then determines that the user has accessed, via the user device, the gaming profile of the gaming software application associated with the entity, monitors the gaming profile of the user for completion of the one or more gaming actions, and allocates to the gaming profile remuneration in an amount correlated to the user's preferred objective.

In example embodiments, a computer system is disclosed for establishing and achieving objectives via a software application. The system includes at least one processor, a communication interface communicatively coupled to the at least one processor, and a memory device storing executable code. The executable code, when executed, causes the processor to determine that a user has accessed, via a user device, a gaming profile associated with an entity. The system transmits to the user, via the user device, a digital communication, wherein the digital communication includes one or more queries for determine a preferred objective of the user. The system receives, from the user device, one or more user inputs in response to the one or more queries, and derives, at least partially based on the one or more inputs, the user's preferred objective, wherein decision tree analysis is utilized to derive the user's preferred objective. The system then determines one or more gaming actions capable of being performed via the user device and associated with the user's preferred objective that would further the user's preferred objective. The system stores the user's preferred objective in an entity data source that stores user data corresponding to a user profile of the user. The system then determines that the user has accessed, via the user device, the gaming profile of the gaming software application associated with the entity. The system monitors the gaming profile of the user for completion of the one or more gaming actions, wherein the one or more gaming actions includes a series of steps to complete the user's preferred objective and allocates to the gaming profile remuneration in an amount correlated to the user's preferred objective.

In an example embodiment, a computer-implemented method is disclosed for establishing and achieving objectives via a gaming software application. The method includes: (1) determining that a user has accessed, via a user device, a gaming profile associated with an entity; (2) transmitting to the user, via the user device, a digital communication, wherein the digital communication comprises one or more queries for determining a preferred objective of the user; (3) receiving, from the user device, one or more user inputs in response to the one or more queries; (4) deriving, at least partially based on the one or more inputs, the user's preferred objective; (5) determining one or more gaming actions capable of being performed via the user device and associated with the user's preferred objective that would further the user's preferred objective; (6) storing the user's preferred objective in an entity data source, wherein the entity data source stores user data corresponding to a user profile of the user; (7) determining that the user has accessed, via the user device, the gaming profile of the gaming software application associated with the entity; (8) monitoring the gaming profile of the user for completion of the one or more gaming actions; and (9) allocating to the gaming profile remuneration in an amount correlated to the user's preferred objective.

According to example embodiments, a gaming system for establishing and achieving objectives includes at least one processor, a communication interface communicatively coupled to the at least one processor, and a memory device storing executable code that, when executed, causes the at least one processor to, receive, via a user device, user input requesting access to a gaming profile associated with an entity. The system receives entity data from the user's gaming profile, collects entity data from a plurality of user profiles associated with the entity, and extracts resource data from the entity data for the user and the plurality of users. In response to extracting the resource data, the system predicts, based on a machine learning dataset and the extracted resource data, a first objective likely to be preferred by the user. Based on the predicted first objective likely to be preferred by the user, the system determines one or more gaming actions capable of being performed via the user device and associated with the gaming profile that would further the first objective likely to be preferred by the user. The system then assigns a remuneration amount to each gaming action of the one or more gaming actions and monitors the gaming profile of the user for completion of the one or more gaming actions in order to allocate to the gaming profile remuneration in the amount assigned to the one or more gaming actions completed by the user.

Example embodiments are disclosed herein including a computer implemented method for establishing and achieving objectives via a gaming software application, the method including: (1) receiving, via a user device, user input requesting access to a gaming profile associated with an entity; (2) receiving entity data from the user's gaming profile; (3) collecting entity data from a plurality of user profiles associated with an entity; (4) extracting resource data from the entity data for the user and the plurality of users; (5) in response to extracting the resource data, predicting, based on a machine learning dataset and the extracted resource data, a first objective likely to be preferred by the user; (6) based on the predicted first objective likely to be preferred by the user, determining one or more gaming actions capable of being performed via the user device and associated with the gaming profile that would further the first objective likely to be preferred by the user; (7) assigning a remuneration amount to each gaming action of the one or more gaming actions; (8) monitoring the gaming profile of the user for completion of the one or more gaming actions; and (9) allocating to the gaming profile remuneration in the amount assigned to the one or more gaming actions completed by the user.

In example embodiments, a computer system is disclosed for establishing and achieving objectives via a gaming software application, the system including at least one processor; a communication interface communicatively coupled to the at least one processor; and a memory device storing executable code. The executable code, when executed, causes the processor to receive, via a user device, user input requesting access to a gaming profile associated with an entity, receive entity data from the user's gaming profile, collect entity data from a plurality of user profiles associated with an entity, and extract resource data from the entity data for the user and the plurality of users. In response to extracting the resource data, the system predicts, based on a machine learning dataset and the extracted resource data, a first objective likely to be preferred by the entity. Based on the predicted first objective likely to be preferred by the user, the system determines one or more gaming actions capable of being performed via the user device and associated with the gaming profile that would further the first objective likely to be preferred by the entity. The system then assigns a remuneration amount to each gaming action of the one or more gaming actions, monitors the gaming profile of the user for completion of the one or more gaming actions, and allocates to the gaming profile remuneration in the amount assigned to the one or more gaming actions completed by the user.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

FIGS. 10A-10B depict a block diagram of a method for achieving objectives via a computer game, in accordance with an embodiment of the present invention.

DETAILED DESCRIPTION

Figure 1:
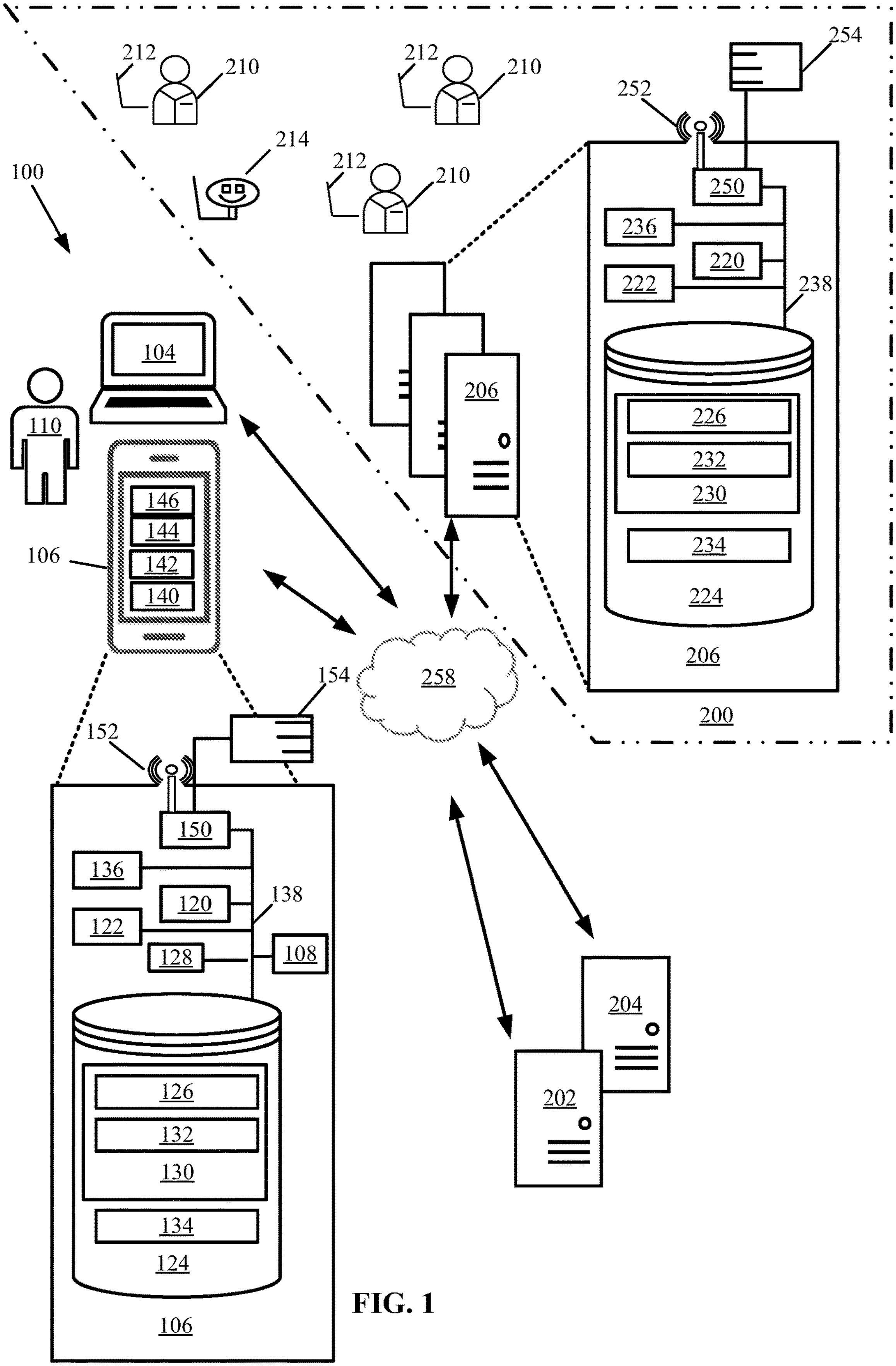
FIG. 1 illustrates a computing environment that includes a computer gaming system for achieving objectives, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

The terminology used herein is for the purpose of describing particular embodiments only and is not intended to be limiting of the invention. As used herein, the singular forms "a." "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method, step of a method, device or element of a device that "comprises," "has," "includes," or "contains," or uses similar language to describe one or more steps or elements possesses those one or more steps or elements, but is not limited to possessing only those one or more steps or elements. Furthermore, a device or structure that is configured in a certain way is configured in at least that way, but may also be configured in ways that are not listed.

Like numbers refer to like elements throughout. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "couple," "coupled," "connected," and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

The present disclosure also describes a novel system and method for employing artificial intelligence ("AI") to initiate a concurrent reaction based on predicted behavior. The examples described herein are related to predicting a user's financial behavior. By using labeled transaction data, users can be grouped into various segments, and tagged accordingly using an AI method, such as clustering, or other classification machine learning methods described herein. Based on these labels an AI method can predict a user's current behavior. Examples of current behavior may include being a new homeowner, saving for a particular event or item, recently married, nearing retirement, frequently overdrafting, etc. Based on these behaviors, an entity may tailor the user experience according to each users predicted future behavior. For example, if someone is a recent homeowner, the entity may provide information about home renovations, or using the equity in the home. In another example, if a user is a frequent overdrafter, the entity may provide a cash advance to help the user get ahead and prevent overdrafts in the future, or provide the user with educational material to help them budget and ultimately prevent overdrafts in the future. The examples listed are only a few examples enabled by the present disclosure.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise (e.g., company, organization, institution, business, university, etc.) that hosts, maintains, or uses computer systems that provide functionality for the disclosed systems and methods. In particular, the term "enterprise" may generally describe a person or business enterprise providing goods and/or services. Interactions between an enterprise system and a user device can be implemented as an interaction between a computing system of the enterprise and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with an external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein with reference to flowchart illustrations and/or block diagrams of computer-implemented method(s) and computing system(s). Each block or combinations of blocks of the flowchart illustrations and/or block diagrams can be implemented by computer readable program instructions or code that may be provided to a processor of a general purpose computer, special purpose computer, programmable data processing apparatus or apparatuses (the term "apparatus" includes systems and computer program products), and/or other device(s). In particular, the computer readable program instructions, which can be executed via the processor of the computer, programmable data processing apparatus, and/or other device(s), create a means for implementing the functions/acts specified in the flowchart and/or block diagram block(s).

In one embodiment, computer readable program instructions may also be stored in one or more computer-readable storage media that can direct a computer, programmable data processing apparatus, and/or other device(s) to function in a particular manner such that a computer readable storage medium of the one or more computer-readable storage media having instructions stored therein comprises an article of manufacture that includes the computer readable program instructions, which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block(s). Additionally or alternatively, these computer program instructions may be stored in a computer-readable memory that can direct a computer, programmable data processing apparatus, and/or other device(s) to function in a particular manner such that the instructions stored in the computer readable memory produce an article of manufacture that includes the computer readable program instructions, which implement the function/act specified in the flowchart and/or block diagram block(s). In some embodiments, computer-implemented steps/acts may be performed in combination with operator/human implemented steps/acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable computer readable program instructions for implementing the specified logical function(s). Similarly, alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, and/or the functions of the blocks may sometimes be executed in the reverse order, depending upon the functionality involved.

FIG. 1 illustrates a computing environment 100 that includes a computer gaming system for achieving objectives, according to at least one embodiment of the present invention. The computing environment 100 generally includes a user 110 (e.g., customer of the enterprise) that benefits through use of services and products offered by an enterprise system 200. Use of the words "service(s)" or "product(s)" as used herein can be interchangeable. The user 110 can be an individual, a group, or any entity in possession of or having access to the user device 104, 106, which may be personal, enterprise, or public items. Although the user 110 may be singly represented in some figures, in at least in some embodiments the user 110 is one of many such that a market or community of users, consumers, customers, business entities, government entities, clubs, and groups of any size.

The computing environment 100 may include, for example, a distributed cloud computing environment (private cloud, public cloud, community cloud, and/or hybrid cloud), an on-premise environment, fog-computing environment, and/or an edge-computing environment. The user 110 accesses services and products of the enterprise system 200 by use of one or more user devices, illustrated in separate examples as user devices 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device 104, 106 may be and/or include a workstation, a server, a set of servers, a cloud-based application or system, or any other suitable system or device adapted to execute any suitable operating system used on personal computers, central computing systems, phones, and/or other devices.

The user device 104, 106, but as illustrated with specific reference to the mobile device 106, includes at least one of each of a processor 120, and a memory device 122 for processing use, such as random access memory (RAM), and read-only memory (ROM), and other various components. The illustrated mobile device 106 further includes a storage device 124 including at least one of a non-transitory storage medium, such as a microdrive, for long-term, intermediate-term, and short-term storage of computer-readable program instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and/or other data items preferred by the user or otherwise required or related to any or all of the applications or programs 130.

The memory device 122 is operatively coupled to the processor 120. As used herein, memory device 122 includes store any computer readable medium configured to store data, code, and/or other information. The memory device 122 may include volatile memory, such as volatile Random Access Memory (RAM), and/or a cache area for the temporary storage of data. The memory device 122 may also include non-volatile memory and may be embedded and/or may be removable. The non-volatile memory additionally or alternatively can include an electrically erasable programmable read-only memory (EEPROM), flash memory, or the like.

According to various embodiments, the memory device 122 and storage device 124 may be combined into a single storage medium. The memory device 122 and storage device 124 can store any of a number of applications that comprise computer-executable program instructions or code executed by the processing device 120 to implement, via the user device 104, 106, the functions described herein. For example, the memory device 122 may store applications and/or association data related to a conventional web browser application and/or an enterprise-distributed application (e.g., a mobile application). These applications also typically provide a graphical user interface (GUI) that is displayed via the display 140 that allows the user 110 to perform functions via the application including to communicate, via the user device 104, 106 with the enterprise system 200, and/or other devices or systems. The GUI on the display 140 may include features for displaying information and accepting inputs from users, and may include input controls such as fillable text boxes, data fields, hyperlinks, pull down menus, check boxes, and the like.

In various embodiments, the user 110 may download, sign into, or otherwise access the application from an enterprise system 200 or from a distinct application server. In other embodiments, the user 110 interacts with the enterprise system 200 via a web browser application in addition to, or instead of, the downloadable version of the application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 may also include the functionality to encode and interleave messages and data prior to modulation and transmission. The processing device 120 can additionally include an internal data modem to convert data from digital format to a format suitable for analog transmission. Further, the processing device 120 may include functionality to operate one or more software programs, which may be stored in the memory device 122 or in the storage device 124. For example, the processing device 120 may be capable of operating a connectivity program such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information and data that are used by the user device 104, 106 as well as the applications and devices that facilitate functions of the user device 104, 106, or that are in communication with the user device 104, 106, to implement the functions described herein, and other functions not expressly described. For example, the storage device 124 may include user authentication information data as well as other data.

The processing device 120, in various examples, can operatively perform calculations, can process instructions for execution, and can manipulate information. The processing device 120 can execute machine-executable program instructions stored in the storage device 124 and/or memory device 122 to perform the methods and functions as described or implied herein. Specifically, the processing device 120 can execute machine-executable instructions to perform actions as expressly provided in one or more corresponding flow charts and/or block diagrams or as would be impliedly understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to and processed by the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and the enterprise system 200.

In some embodiments, a credentialed system enabling authentication of a user may be necessary in order to provide access to the enterprise system 200. In one embodiment, the input and output system 136 may be configured to obtain and process various forms of authentication to authenticate a user 110 prior to providing access to the enterprise system 200. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning System (GPS) transceiver configured to be used by a positioning system to determine a location of the computing device 104 or mobile device 106. In some embodiments, the positioning system device 108 includes an antenna, transmitter, and receiver. In one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), electrically connects the various described, illustrated, and implied components of the mobile device 106. The intraconnect 138, in various non-limiting examples, can include or represent, a system bus, a high-speed interface connecting the processing device 120 to the memory device 122, providing electrical connections among the components of the mobile device 106, and may include electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide wired (e.g., via wired or docked communication by electrically conductive connector 154) or wireless (e.g., via wireless communication device 152) two-way communications and data exchange. Communications may be conducted via various modes or protocols, of which GSM voice calls, short message service (SMS), enterprise messaging service (EMS), multimedia messaging service (MMS) messaging. TDMA, CDMA, PDC, WCDMA, CDMA2000, and GPRS, are all non-limiting and non-exclusive examples. Wireless communications may be conducted via the wireless communication device 152, which can include, as non-limiting examples, a radio-frequency transceiver, a Bluetooth device, Wi-Fi device, a Near-field communication device, and other transceivers. In addition, GPS connections may be included for ingoing and/or outgoing navigation and location-related data exchanges. Wired communications may be conducted, e.g., via the connector 154, by USB, Ethernet, and/or other physically connected modes of data transfer.

The processing device 120 may, for example, be configured to use the communication interface 150 as a network interface to communicate with one or more other devices on a network. In this regard, the communication interface 150 utilizes the wireless communication device 152 such as an antenna operatively coupled to a transmitter and a receiver (or together a "transceiver") included with the communication interface 150. The processing device 120 is configured to provide signals to and receive signals from the transmitter and receiver, respectively. In various embodiments, the signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, and/or fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), with fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

The computing environment 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging. TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, systems, entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes. The enterprise system 200 may communicate with the external system 202, 204 using any combination of public or private communication.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

According to one embodiment, a user 110 may initiate an interaction with the enterprise system 200 via the user device 104, 106 and based thereon the enterprise system 200 may transmit, across a network 258, to the user device 104, 106 digital communication(s). In order to initiate the interaction, the user 110 may select, via display 140, a mobile application icon of a computing platform of the enterprise system 200, login via a website to the computing platform of the enterprise system 200, or perform various other actions using the user device 104, 106 to initiate the interaction with the enterprise system 200. In other embodiments, the enterprise system 200 may initiate the interaction with the user 110 via the user device 104, 106. For instance, periodically the enterprise system 200 may transmit unprompted communication(s) such as a short message service (SMS) text message, multimedia message (MMS), or other messages to the user device 104, 106 that includes an embedded link, a web address (e.g., a uniform resource locator (URL)), a scannable code (e.g., a quick response (QR) code, barcode, etc.) to prompt the user 110 to interact with the enterprise system 200.

Once an interaction has been established between the enterprise system 200 and the user device 104, 106, data and/or other information may be exchanged via data transmission or communication in the form of a digital bit stream or a digitized analog signal that is transmitted across the network 258. Based on the user 110 of the user device 104, 106 providing one or more user inputs (e.g., via the user interface, via a speech signal processing system, etc.) data may be received by the enterprise system 200 and data processing is performed thereon using, for example, processing device 220. This received data may then be stored to the storage device 224 or to a third party storage resource such as, for example, external systems 202, 204, which may include a cloud storage service or remote database. Additionally, this collected response data may be aggregated in order to allow the enterprise to have a sampling of responses from multiple users 110. Such aggregated data may be accessible by a relational database management system (e.g., Microsoft SQL server, Oracle Database, MySQL, PostgreSQL, IBM Db2, Microsoft Access, SQLite, MariaDB, Snowflake, Microsoft Azure SQL Database, Apache Hive, Teradata Vantage, etc.) or other software system that enables users to define, create, maintain and control access to information stored by the storage device 224, database, and/or other external systems 202, 204. According to one embodiment, the relational database management system may maintain relational database(s) and may incorporate structured query language (SQL) for querying and updating the database. The relational database(s) may organize data into one or more tables or "relations" of columns (e.g., attributes) and rows (e.g., record), with a unique key identifying each row. According to various embodiments, each table may represent a user/customer profile and the various attributes and/or records may indicate attributes attributed to the user/customer.

For instance, the user/customer profiles may be classified based on various designations/classifiers such as their financial assets, income, bank account types, age, geographic region(s), etc. Each designation/classifier may also include a plurality of sub categories. Storing the collected data to the relational database of the relational database management system may facilitate sorting of the data to filter based on various categories and/or subcategories and/or performing data analytics thereon. According to some embodiments, the enterprise system 200 may utilize algorithms in order to categorize or otherwise classify the data.

The collected data may also have metadata associated therewith that can be accessed by the enterprise system 200. The metadata may include, for example, (i) sequencing data representing the data and time when the response data was created, (ii) modification data indicating the individual (such as user 110) that last modified specific information/data, (iii) weighting data representing the relative importance or magnitude of the attributes, (iv) provider identifier data identifying the owner of the data (e.g., the entity that operates the enterprise system 200), and/or (v) other types of data that could be helpful to the enterprise in order to classify and analyze the collected data.

According to one embodiment, the relational database(s) may store data associated with user/customer profiles in order to sync this data with a gaming functionality and/or application. In particular, the enterprise system 200 may include an enterprise mobile software application that includes a gaming functionality that may be installed on or otherwise accessed by the user device 104, 106. When the user 110 accesses the gaming functionality, the user 110 may be rewarded by performing various tasks. In particular, the user 110 may receive rewards for accomplishing various goals related to financial wellness. The gaming functionality may help the user develop smart financial habits with monetary rewards for developing these habits and is rooted in behavioral economics.

In general, the gaming application disclosed herein may operate via external systems 202, 204 and provides front-end functionalities that enable the user 110 to interact with games. In particular, the external systems 202, 204 may host the game server(s). In one embodiment, the external systems 202, 204 include Amazon Web Services (AWS), which provides a workflow for developing, deploying, and hosting the gaming application. Further, the games may incorporate user/customer profiles that may be linked to that specific user's/customer's profile that is stored within or otherwise associated with the enterprise system 200. By syncing the user/customer profile for the gaming application with the user/customer profile of the enterprise system 200, the gaming application can access information about the user 110 that is derived from the user/customer profile of the enterprise system 200. This enables the gaming application to utilize user/customer data in order to personalize the game in accordance with various enterprise objectives. In a non-limiting example, user/customer data stored by the enterprise system 200 that indicates current account balances may be accessed by the game server(s) of the external system 202, 204 in order to personalize the gaming experience for the user 110 by encouraging certain financial behaviors. Other external system 202, 204 may include promotional prize server(s) that can be configured to generate one or more random numeric outcomes based on one or more rules defining a win likelihood.

To perform various functionalities associated with the gaming application, the game server(s) may be configured to make an API call to the prize server(s) to provide information necessary to generate a random numeric outcome. For instance, the API call may indicate a current game at a current level, and the prize server(s) process the information provided to generate a random number based on that information in accordance with various rules defining a win likelihood. The prize server(s) then provide results from the random number generator, which is used to determine a monetary reward in response to the actions performed by the user 110. In addition, the monetary rewards obtained as a result of performing various actions via the gaming application may be transferred to user/customer accounts identified by the user/customer profile of the enterprise.

Figure 2:
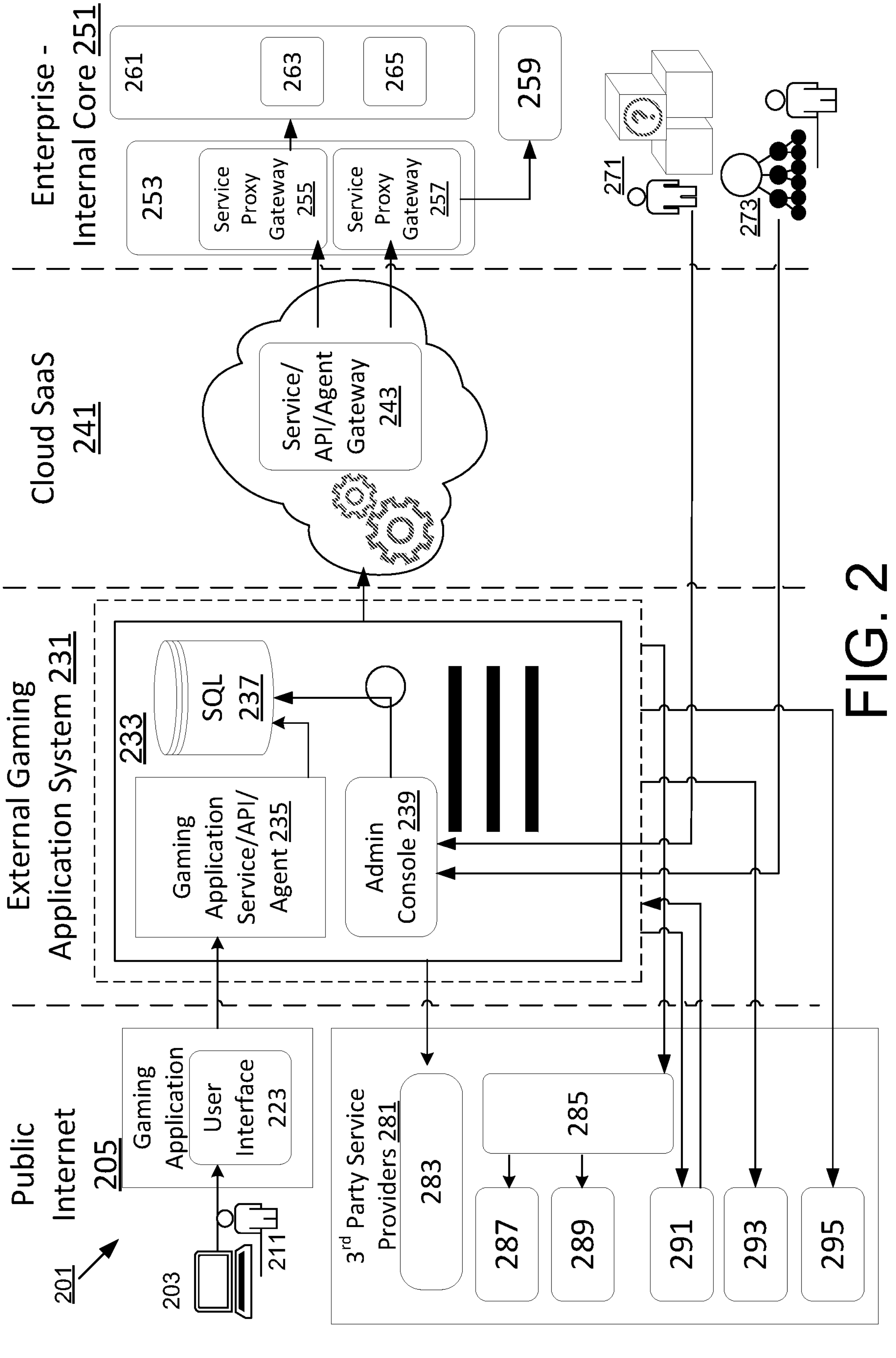
FIG. 2 depicts an example flow diagram for network communication associated with a gaming application, in accordance with an embodiment of the present invention.

FIG. 2 depicts an example flow diagram 201 for network communication associated with an external gaming application system 231, in accordance with an embodiment of the present invention. In particular, the flow diagram 201 depicts a user 211 providing one or more inputs, via a user device 203, to access the gaming application 221 across a public network 205 (e.g., public internet). The gaming application 221 includes a user interface 223 through which the user 211 interacts in order to play electronic game(s) (i.e., video game(s)). The game(s) may be played when the user 211 interacts via the user interface 223 and/or through other input device(s) (e.g., a joystick, controller, keyboard, motion sensing device, etc.). Inputs provided by the user 211 may generate visual feedback through a display of the user device 203.

The gaming application 221 is configured to communicate with an external gaming application system 231 that include server(s) 233 that are used to host the gaming application 221. Example cloud-based sever(s) 233 include, for example, AWS. The cloud-based server(s) 233 that host the gaming application 221 include the gaming application service/API/agent 235 that receives an API call from the gaming application 221. The API call utilizes a uniform resource identifier (URI), such as a URL, that identifies the cloud-based server(s) 233, incorporates the application layer protocol (e.g., the HTTP method) indicating the desired action to be performed by the service/API/agent 235 (e.g., the data to be extracted, the functionality to be performed, etc.), includes a header so that the service/API/agent 235 understands the request, and includes an API key or access token used by the service/API/agent 235 to authenticate the API call. The service/API/agent 235 accesses data from the relational database 237 (e.g., SQL database), which may include a collection of structured data needed for the gaming application 221 to integrate various features. The admin console 239 is used by support and developers to provide administrative functions (e.g., provide support for customers, check on the health of the external gaming application system, etc.).

The external gaming application system is integrated with a cloud SaaS 241, which is configured to receive API calls from the cloud-based server(s) 233 to access user data associated with a user profile of the user 211. In a non-limiting example, the user data includes information associated with financial services and products offered by the enterprise such as direct deposit information, current financial balance information, financial savings information, financial transaction history, etc.). The cloud SaaS 241 includes a service/API/agent gateway 243, which acts an edge gateway or network entry point for the enterprise—internal core system 251. The service/API/agent gateway 243 may provide, according to one embodiment, network translation between networks that use different protocols and may include routers, routing switches, multiplexers, etc. In one particular embodiment, the service/API/agent gateway 243 includes various permissions to perform calls to fetch the user data.

Retrieval of user data within the enterprise—internal core system 251 is facilitated by use of service proxy gateway(s) 255, 257 of the gateway platform 253. The gateway platform 253 is a multichannel API gateway configured to provide security, control, integration and optimized access to fetch user data. The service proxy gateway(s) 255, 257 are modules that receive the API requests and forward them to defined endpoints within the internal enterprise system 261. In particular, the service proxy gateway(s) 255, 257 facilitate load balancing, access filtering, caching, etc. The internal enterprise system 261 includes an API-powered business ecosystem that enables the enterprise to perform various backend services and business functionalities. The internal enterprise system 261 includes service/API/agent systems 263, 265 that can be used to access the user data from original data sources and used to facilitate payments from a holding account of the cloud-based server(s) 233 so that the financial payments can be transferred to deposit account(s) associated with the user profile of the user 211. According to various embodiments, the financial payments may be made according to a predefined schedule and/or in response to a request from the user 211. The enterprise—internal core system 251 also includes a digital identity and authentication system 259 that is used to authenticate the user 211 and link the user's gaming profile/account to their user profile associated with the enterprise. The enterprise—internal core system 251 is also used by support agents 271 to provide customer support, resolve customer inquiries, etc. Further, the enterprise—internal core system 251 is used by administrators 273 to provide administrative functions for the external gaming application system 231.

Various third-party service providers 281 are also integrated with the external gaming application system 231. One example third-party service provider includes a game operator system 283 that includes promotional prize server(s) that can be configured to generate one or more random numeric outcomes based on one or more rules defining a win likelihood. A communication provider 285 may provide digital communications such as electronic messages through a communications platform 287 and push notifications through an operating system 289. A marketing analysis platform 291 may be used to analyze the efficacy of various messaging and communications associated with the gaming application system 231 and can provide feedback that can be used by the gaming application system 231 to modify functionalities to align with enterprise objectives. For example, the marketing analysis platform 291 may be used for inbound marketing channel attribution and outbound marketing channel attribution so that the enterprise may determine how marketing tactics influence customer interactions. A monitoring system provider 293 may provide off-duty support to detect problems with the gaming application system 231 by using real-time monitoring. When a problem is detected, the monitoring system provider 293 distributes an alert so that the problem can be resolved. An analytics provider 295 may analyze ways in which users interact with the gaming application system 231 in order to perform user experience analysis. Various additional or alternative third-party service providers 281 may also be utilized according to various embodiments.

In other embodiments, the external gaming application 231 is not external to the enterprise internal core 251. Rather, a gaming application may be integrated within the enterprise internal core 251, which advantageously eliminates use of the cloud SaaS 241. In particular, cloud-based server(s) 233 that host the gaming application 221, such as those provided via AWS would still host the gaming application 221, but the application system would be integrated within the enterprise internal core 251. The processes and systems described herein are not limited to the example flow diagram 201, and various other network flow communications may alternatively be implemented that would facilitate access to the gaming application 221.

Although not depicted by the workflow of flow diagram 201, in other embodiments, the user device 203 may be used to access an enterprise application rather than the gaming application 221, in which case the enterprise application is configured to communicate with the enterprise internal core 251 via service/API/agent systems 263, 265. In this embodiment, when the user 211 provides inputs via the enterprise application, which is received via service/API/agent systems 263, 265, the enterprise internal core 251 utilizes the service/API/agent gateway 243 of the cloud SaaS 241 to communicate with the external gaming application system 231. For instance, this embodiment may be used to determine whether a user profile of the user 211 that is associated with the enterprise internal core 251 is integrated with a second user profile of a the external gaming application system 231. As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 3A) may include a topography with a hidden layer 264 between an input layer 262 and an output layer 266. The input layer 262, having nodes commonly referenced in FIG. 3A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 3A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 3A:
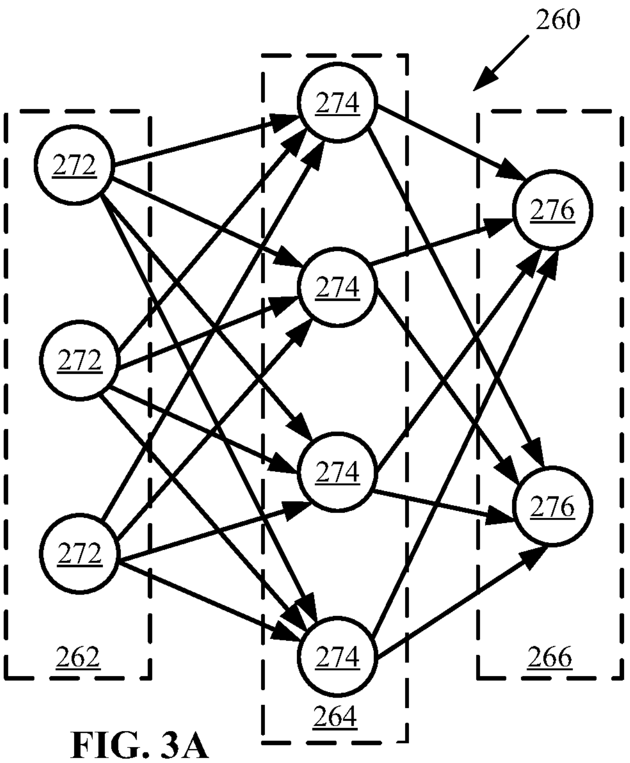
FIG. 3A is a diagram of a feedforward network, according to at least one embodiment, utilized in machine learning
Figure 3C:
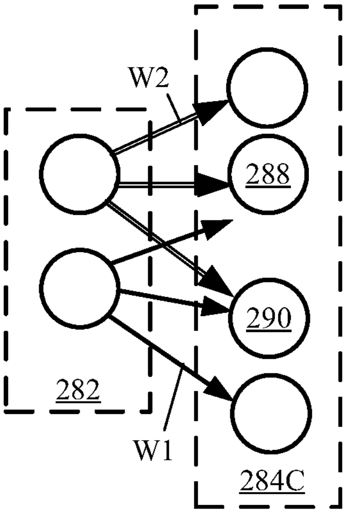
FIG. 3C is a diagram of a portion of the convolution neural network of FIG. 3B, according to at least one embodiment, illustrating assigned weights at connections or neurons.
Figure 3B:
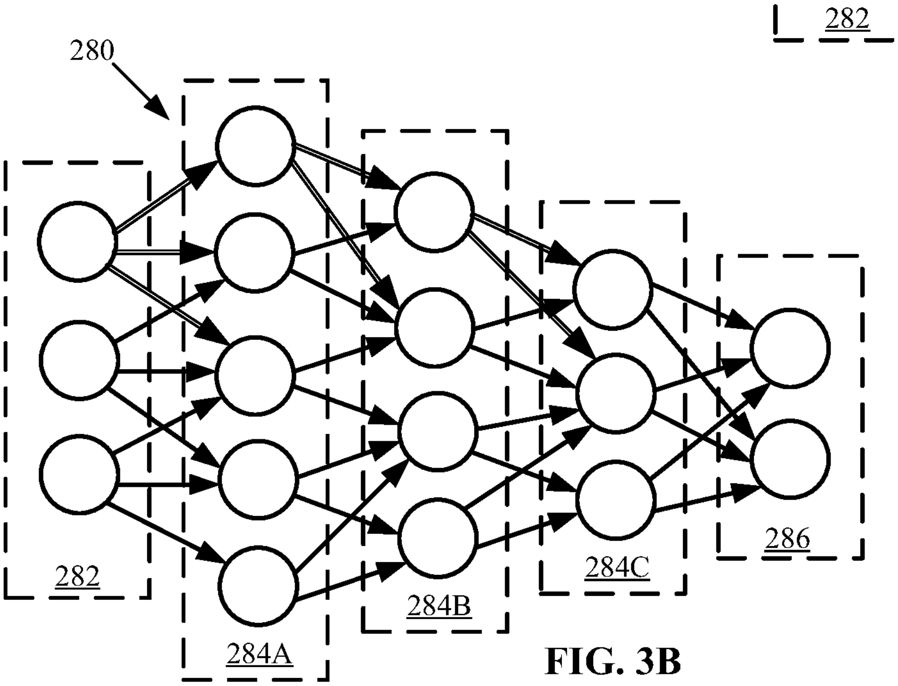
FIG. 3B is a diagram of a convolution neural network, according to at least one embodiment, utilized in machine learning.

An exemplary convolutional neural network CNN is depicted and referenced as 280 in FIG. 3B. As in the basic feedforward network 260 of FIG. 3A, the illustrated example of FIG. 3B has an input layer 282 and an output layer 286. However where a single hidden layer 264 is represented in FIG. 3A, multiple consecutive hidden layers 284A, 284B, and 284C are represented in FIG. 3B. The edge neurons represented by white-filled arrows highlight that hidden layer nodes can be connected locally, such that not all nodes of succeeding layers are connected by neurons. FIG. 3C, representing a portion of the convolutional neural network 280 of FIG. 3B, specifically portions of the input layer 282 and the first hidden layer 284A, illustrates that connections can be weighted. In the illustrated example, labels W1 and W2 refer to respective assigned weights for the referenced connections. Two hidden nodes 288 and 290 share the same set of weights W1 and W2 when connecting to two local patches.

Figure 4:
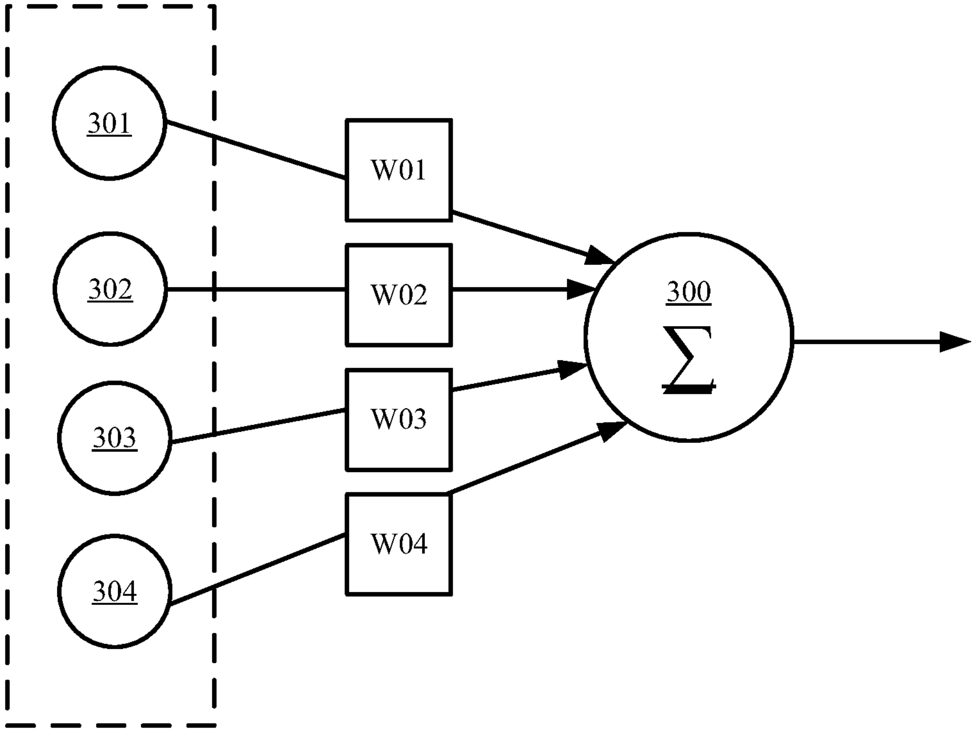
FIG. 4 is a diagram representing an exemplary weighted sum computation in a node in an artificial neural network, according to at least one embodiment.

Weight defines the impact a node in any given layer has on computations by a connected node in the next layer. FIG. 4 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 5:
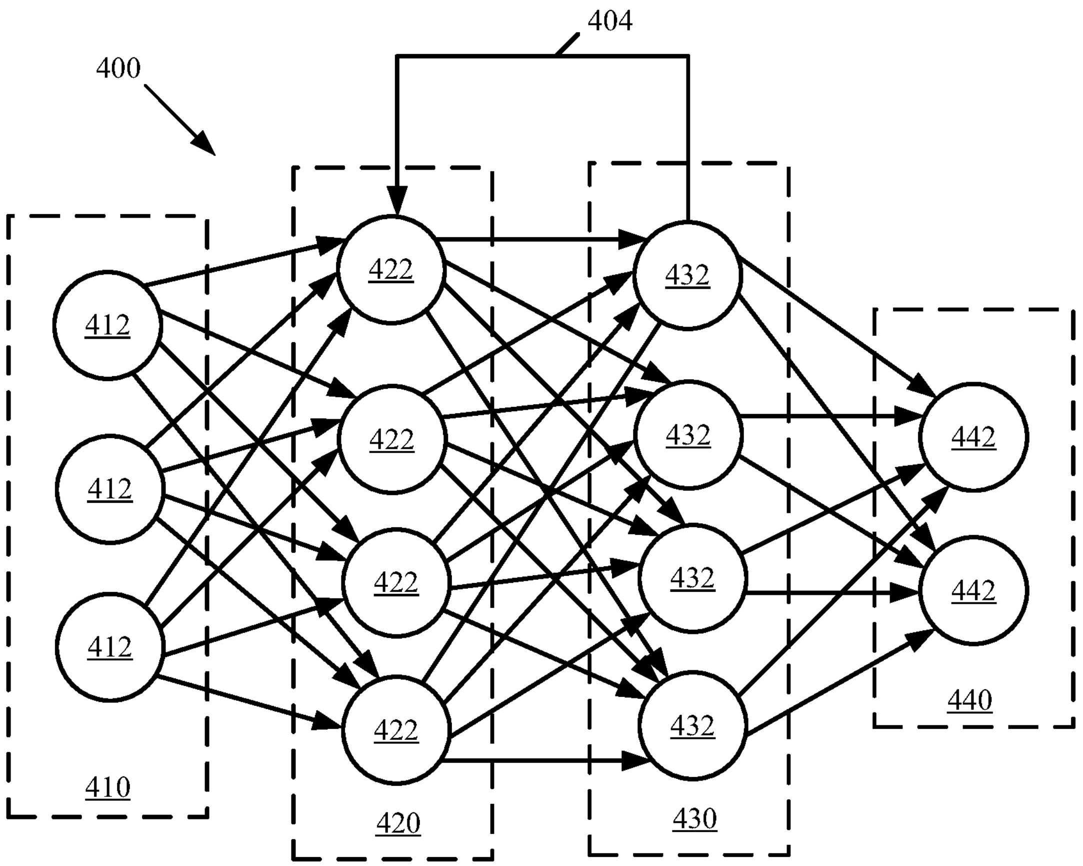
FIG. 5 is a diagram of a Recurrent Neural Network RNN, according to at least one embodiment, utilized in machine learning.

An example for a Recurrent Neural Network RNN is referenced as 400 in FIG. 5. As in the basic feedforward network 260 of FIG. 3A, the illustrated example of FIG. 5 has an input layer 410 (with nodes 412) and an output layer 440 (with nodes 442). However, where a single hidden layer 264 is represented in FIG. 3A, multiple consecutive hidden layers 420 and 430 are represented in FIG. 5 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 6:
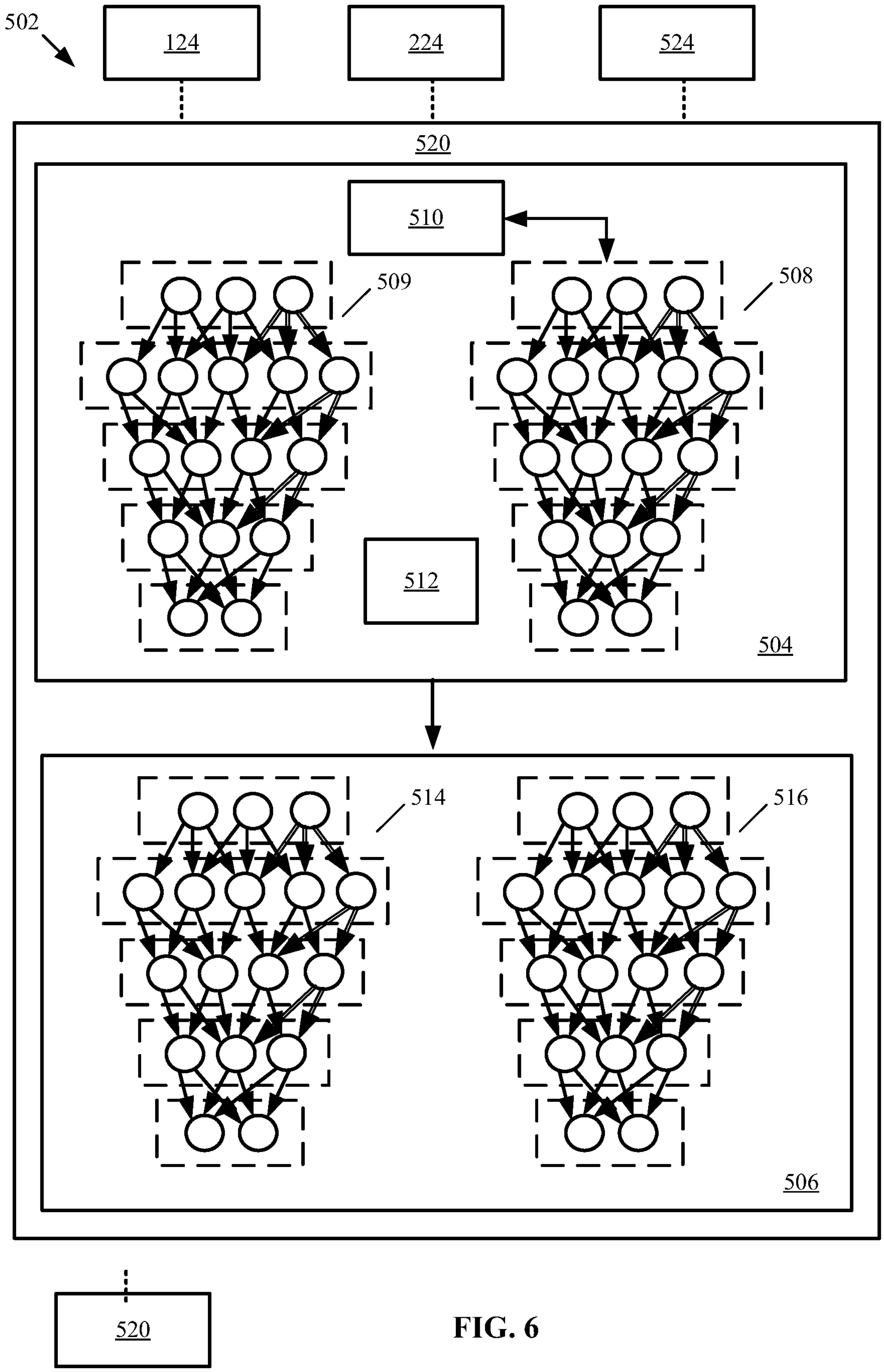
FIG. 6 is a schematic logic diagram of an artificial intelligence program including a front-end and a back-end algorithm, according to at least one embodiment.

Referring now to FIG. 6 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 6) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 7:
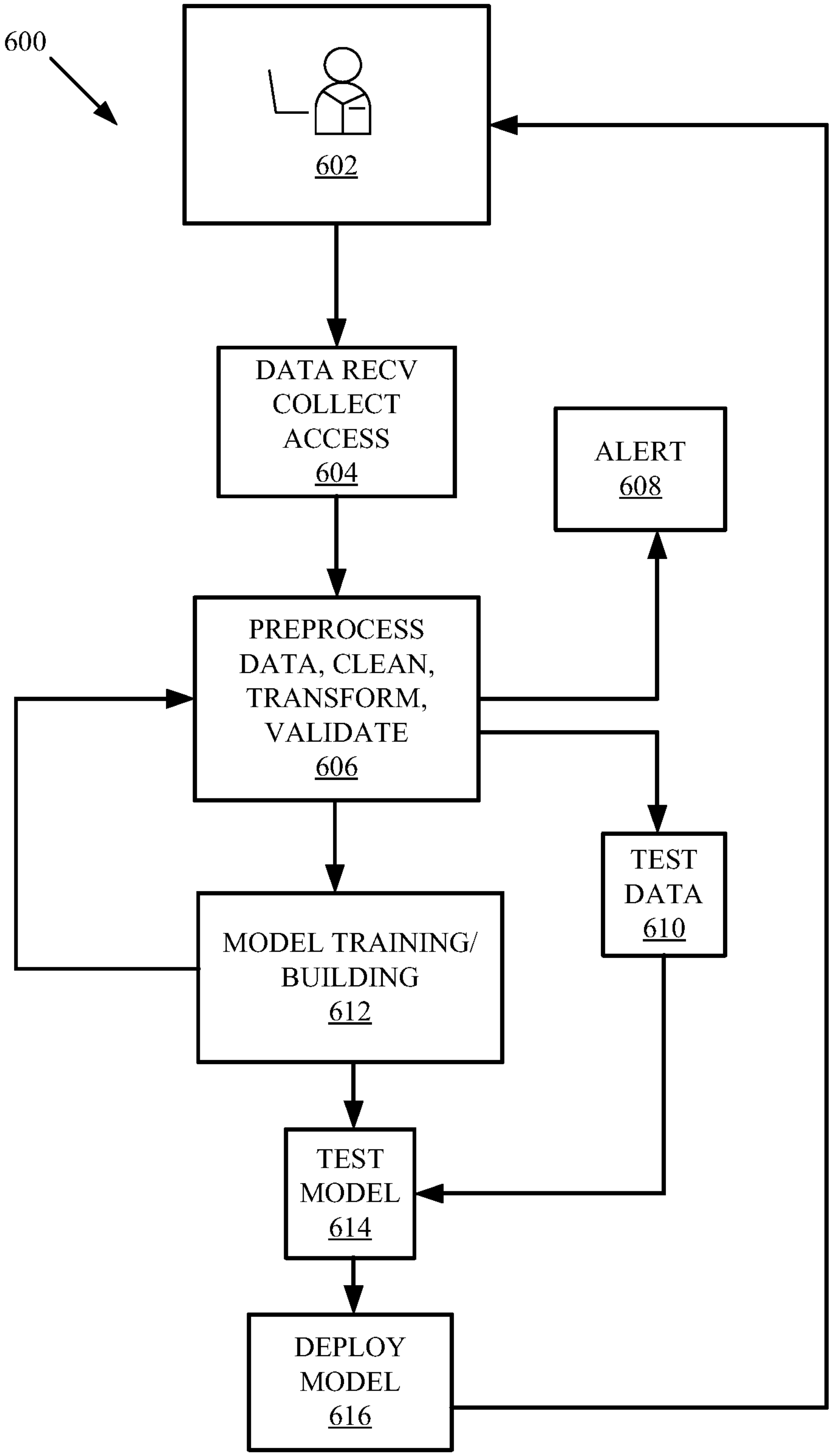
FIG. 7 is a flow chart representing a method, according to at least one embodiment, of model development and deployment by machine learning.

FIG. 7 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Various Systems and Methods for Achieving Financial Goals

Various systems and methods may be used to allow a user or an entity to achieve their financial goals. In a first embodiment, the user is able to select from a predetermined list or manually enter the user's own financial goals. In another embodiment, a user may be presented with a series of questions to determine what is most important with regard to their finances. Finally, decision trees or machine learning may be used to determine—based on the user's similarity to other gaming users or customers of the entity or any other available financial information—what a user's financial goals should be. Although discussed with reference to financial goals, the below systems and methods may be utilized in any particular gaming environment to further a user's objectives. Additionally, at any point in the gaming process, a user may decide to change their financial goals, and do so accordingly. In these instances, the system would just create new games or gaming actions for the user to complete to achieve their desired goals.

According to various embodiments, the computer system determines that a user has initiated, via a user device, a gaming profile associated with an entity through any type of access to the gaming profile, which includes creating a new gaming account or signing in to an existing account. In some embodiments, this initiation process includes authenticating authentication information provided, via the user device. This authentication process includes verifying that the authentication information that is received matches stored credentials of the user from a database of authorized users. The authentication process can utilize encrypted authentication information that the computer system decrypts, and the decryption process transforms encrypted information into its original format. Also, the process of encryption transforms information from its original format (e.g., the plaintext) to an unreadable format (e.g., ciphertext), and the decryption reconverts the information from its unreadable format back into a readable format.

The disclosed systems and methods provide a specific improvement over prior systems in that the disclosed gaming systems and methods are used to educate consumers to achieve their financial goals, to help consumers actually achieve their financial goals, and to assist an entity with achieving their objectives—such as retaining customers and providing additional services to said customers. Specifically, the disclosed systems and methods help users achieve their goals or objectives but also help to steer user behavior through the use of incentives that are mutually beneficial or symbiotic to both the consumer and the entity. The disclosed systems and methods recite an additional element that reflects an improvement in the functioning to the technical field of computer gaming systems in that the computer gaming systems present a user with educational material based on the user's current financial state or status. The disclosed systems and methods also offer an improvement in the functioning to the technical field of computer gaming systems in that they can be tailored to a particular user based on prior user interactions and any changes in goals or behaviors of the particular user. For example, a user may create a gaming profile and select a goal of saving for a rainy day (i.e., an emergency fund), but then the user may begin overindulging and overspending on online shopping, purely for the joy of receiving a package every day as if it were Christmas, and decide to come to their senses and change their goal within the gaming system to reducing their debt. Alternatively, the system, based on the user's overspending, may suggest the goal of reducing debt to the user through the gaming system. This goal change would not only benefit the user by assisting them with reducing their debt, but could also benefit the entity by allowing it to suggest other products or services to the user to help them achieve their goal, thereby retaining the customer and gaining more business from them.

In order to achieve both the user's goals and the entity's goals, the computer gaming system accesses an entity data source (e.g., a database, memory, etc.) that stores user data corresponding to a user profile of the user, where the user data includes information about current user resources, spending habits, and other account data information such as the user's age, whether the user has any dependents, the user's marital status, the number and type of accounts or products/services the user has or utilizes with the entity, etc. Initially, when that user data is accessed, the computer gaming system may provide the user with a list of predetermined, universal goals or objectives for the user to choose from that would be applicable for any user of the gaming system (i.e., saving, purchasing, retiring, increasing credit score, etc.).

Ultimately, the computer gaming system may also derive goals for both the user and the entity based on the user data the system has gleaned. Specifically, the computer gaming system processes the user data and identifies aspects of the user data that could be used to further objectives/goals of the user and/or entity. In identifying aspects of the user data that could be used to further objectives/goals, the system performs an in-depth analysis of the user data to identify objectives/goals that are specific to the user and/or entity that the user can select or that the system may suggest to the user. An example includes a hierarchical decision tree model created through machine learning. For instance, the decision tree model may incorporate a supervised or unsupervised machine learning categorization process that evaluates probability values in response to relevant input variables obtained from the user data. The system then determines and allocates remunerations for each possible outcome and calculates the value of the user/entity objectives for each chance node in order to determine what user action would provide the most value to the user and/or entity. In particular embodiments, the user may exchange the digital remuneration, or digital currency, for legal tender. In a non-limiting example, the system may store several overarching objectives/goals specific to the entity, and from those overarching objectives/goals, the computer system identifies objectives/goals that would be relevant to the user.

If, for example, the entity is a financial institution such as a bank, the overarching objectives/goals of the bank may be related to increasing deposits and growing the loan business, with more specific objectives/goals related to increasing user savings, increasing user engagement, promoting cross-selling with partner entities, promoting fiscal learning, borrowing facility initiation, and increasing user retention. The user-specific objectives/goals that are derived would account for many user-specific variables. For example, the user data gathered would account for the age and/or proximity to retirement, financial well-being, income level, buying habits, current life situation (e.g., if the customer is paying tuition they are likely to be a student or have a dependent in school), etc. During this process, the computer system analyzes these variables and predicts what actions the customer/user is most likely to make that would help the financial institution and the user achieve their overarching objectives.

Once the objectives/goals of the user and/or entity are determined, the system then determines gaming actions capable of being performed via a user device that would further the objectives/goals. This determination of the gaming actions includes formulating incentives that could be associated with the user's gaming profile that would further or otherwise advance the entity's and/or user's objectives/goals. For example, the one or more gaming actions may include scrolling through and/or reading an informational article on a certain subject; contributing real-world resources such as money to a savings account, 401k, retirement account, emergency fund, etc.; repeatedly visiting the gaming application thereby driving user engagement; purchasing products from partner entities so that the entity receives sponsorship payments; and/or various other gaming actions capable of being performed via the user device and associated with the gaming profile.

When the user initiates the gaming profile to play various games the user's progress towards the one or more entity objectives/goals can be displayed via a user interface of the user device. Specifically, the computer system initiates displaying, via the user interface of the gaming software application, where the gaming software application is accessible via the user device, the user's progress towards the one or more objectives/goals. The user's progress may be displayed using graphical user interface elements that provide a visual representation of the user's progress. Many visual conventions can be used to represent the user's progress, and these visual conventions can include icons, widgets (e.g., control inputs), tabs, menus, windows, etc. In some embodiments, interface objects (e.g., cursor, pointer, adjustment handle, etc.) can be used by the user via the user interface to interact with the visual representations.

Predetermined Financial Goals

Figure 8:
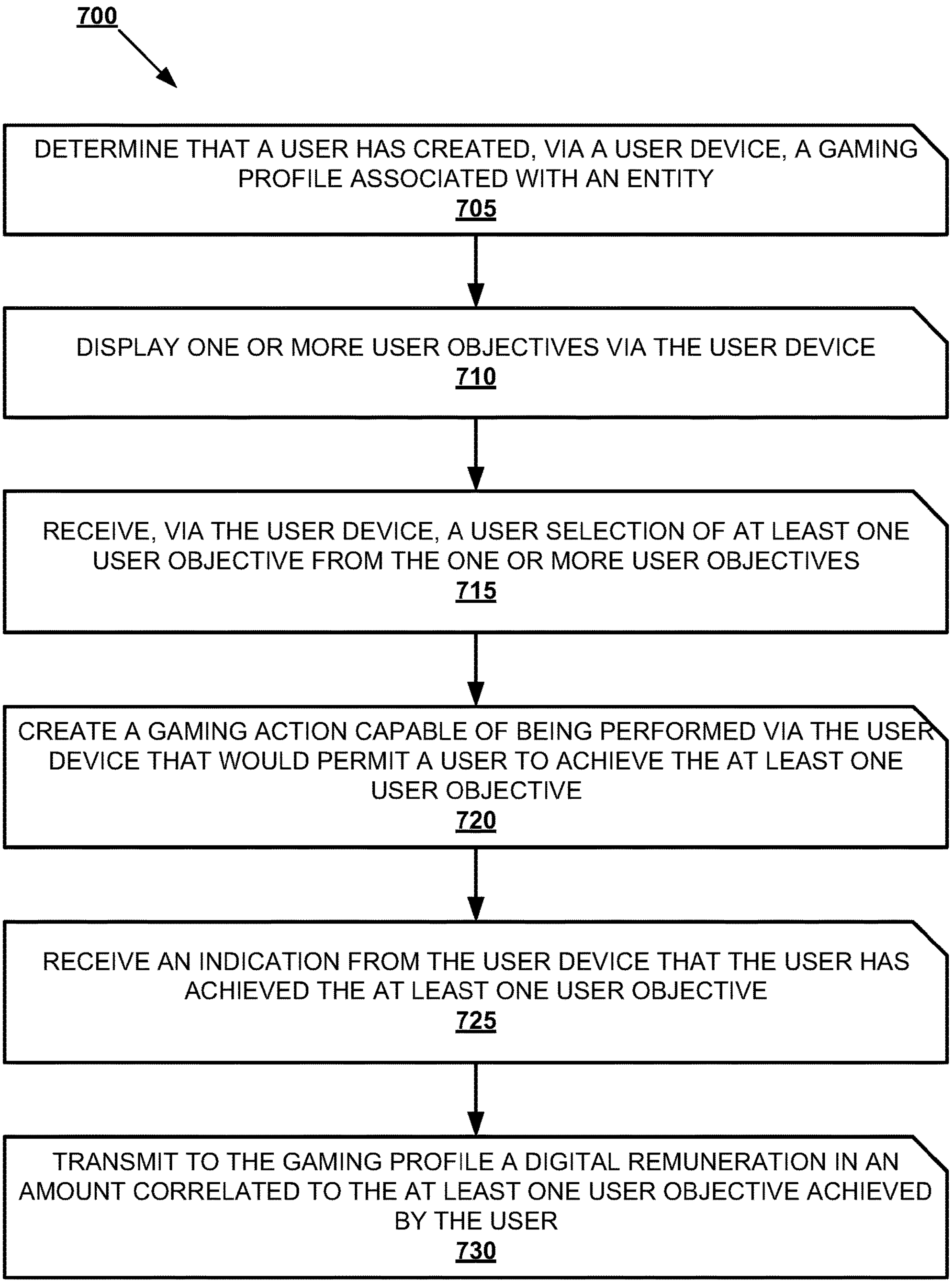
FIG. 8 depicts a block diagram of a method for facilitating establishing symbiotic objectives, in accordance with an embodiment of the present invention.

FIG. 8 depicts a block diagram of a method 700 for establishing and achieving objectives using a computer gaming system. The method 700 is performed when a processor executes executable code. At block 705, the processor determines that a user has created, via a user device, a gaming profile associated with an entity. For instance, the user may create a new gaming profile/account, or access an existing profile/account, by providing authentication information (e.g., login credentials such as a username and password). In certain embodiments, the authentication credentials may include facial recognition, fingerprint recognition, etc. In various embodiments, the creation of the gaming profile may include an authentication process, where the system authenticates the user and the user profile by verifying authentication data obtained from the user by comparing the authentication data with stored information. when the user has been authenticated or verified, then the system grants access to the user's gaming profile.

At block 710, the processor displays one or more user objectives via the user device to the user. In example embodiments, the user objectives may be any suitable objective that may be accomplished, performed, or achieved on a user device. In particular embodiments, the user objective is an objective that is applicable to a wide range of people, such as a universal objective. For example, one such universal objective may include gaining proficiency in one or more basic financial skills. For instance, the user objective, or basic financial skill, may include everything from saving, purchasing, retiring, to increasing the user's credit score. In some embodiments, the user objective may be manually entered by the user as a custom user objective. For example, if the user is wanting to save to purchase an engagement ring, the user may simple enter "Fiancé" as the user objective. Thus, the one or more user objectives may either be presented by the system to the user or provided by the user themselves. Alternatively, the system may limit the number of user objectives to a selection of predetermined objectives. In various embodiments, the user objective is directly related to a financial goal. In some embodiments, the financial goal may be a mutually beneficial goal for the user and the entity. For example, where the user objective is to saving for an emergency, if the entity is a financial institution such as a bank, having the user saving their money in their account associated with the financial institution benefits both the user and the bank because the user will ultimately have money in case of emergency, and the bank is able to retain the customer and their business.

In various embodiments, rather than displaying one or more user objectives, the system may transmit, via the user device, a first user objective and a second user objective. In these embodiments, the first user objective may be a universal and the second objective may include a more narrowed, personalized objective relevant for the particular user.

At block 715, the processor receives, via the user device, a user selection of at least one user objective from the one or more user objectives. In this particular embodiment, the user is able to select a user objective from preselected or predetermined objectives. These objectives may be personally tailored for the particular user or may be more generalized and applicable to the general public. In various embodiments, the user may select more than one user objective from the one or more user objectives. Conversely, the user may, as discussed above, input their own personal user objective. For example, the user may want to save for a fancy dinner, in which case, the user may input "dinner" as the user objective.

At block 720, the processor creates a gaming action capable of being performed via the user device that would permit a user to achieve the at least one user objective. Example gaming actions may include scrolling through and/or reading an informational article on a certain subject or completing another learning activity provided by the entity, contribute real-world resources such as money to a savings account, 401k, retirement account, emergency fund, or other specific purpose, repeated visits to the gaming application to drive user engagement, purchase products from partner entities so that the entity receives sponsorship payments, loan initiation, and/or various other gaming actions capable of being performed via the user device and associated with the gaming profile.

At block 725, the processor receives an indication from the user device that the user has achieved or completed the at least one user objective. In particular embodiments, the processor may track the user's progress as the user plays the game or interacts with the gaming system to determine whether the user has completed the user objective.

At block 730, the processor transmits to the gaming profile a digital remuneration in an amount correlated to the at least one user objective achieved by the user. In various embodiments, the processor calculates and assigns, based at least in part on the one or more entity aims, a weighted value to each gaming action of the one or more gaming actions. When the entity aims are ranked in order of priority, the one or more gaming actions that correspond to each of the one or more entity aims may be given a weighted value correlating to the importance of the gaming action that corresponds to the entity aim. In particular embodiments, the system allocates to the gaming profile remuneration in an amount correlated with the weighted value assigned to the completed one or more gaming actions. In some embodiments, the remuneration includes an in-game resource that is capable of being exchanged for gameplay access associated with the gaming profile that enables participation in an application game. In some embodiments, the application game supplements or augments the current user resources upon meeting game criteria, where the current user resources include a real-world resource such as real-world currency. In some embodiments, the user may be awarded or otherwise allocated the remuneration upon completion of an undisclosed number of actions of the one or more gaming actions.

Survey-Based Financial Goals

Figure 9A:
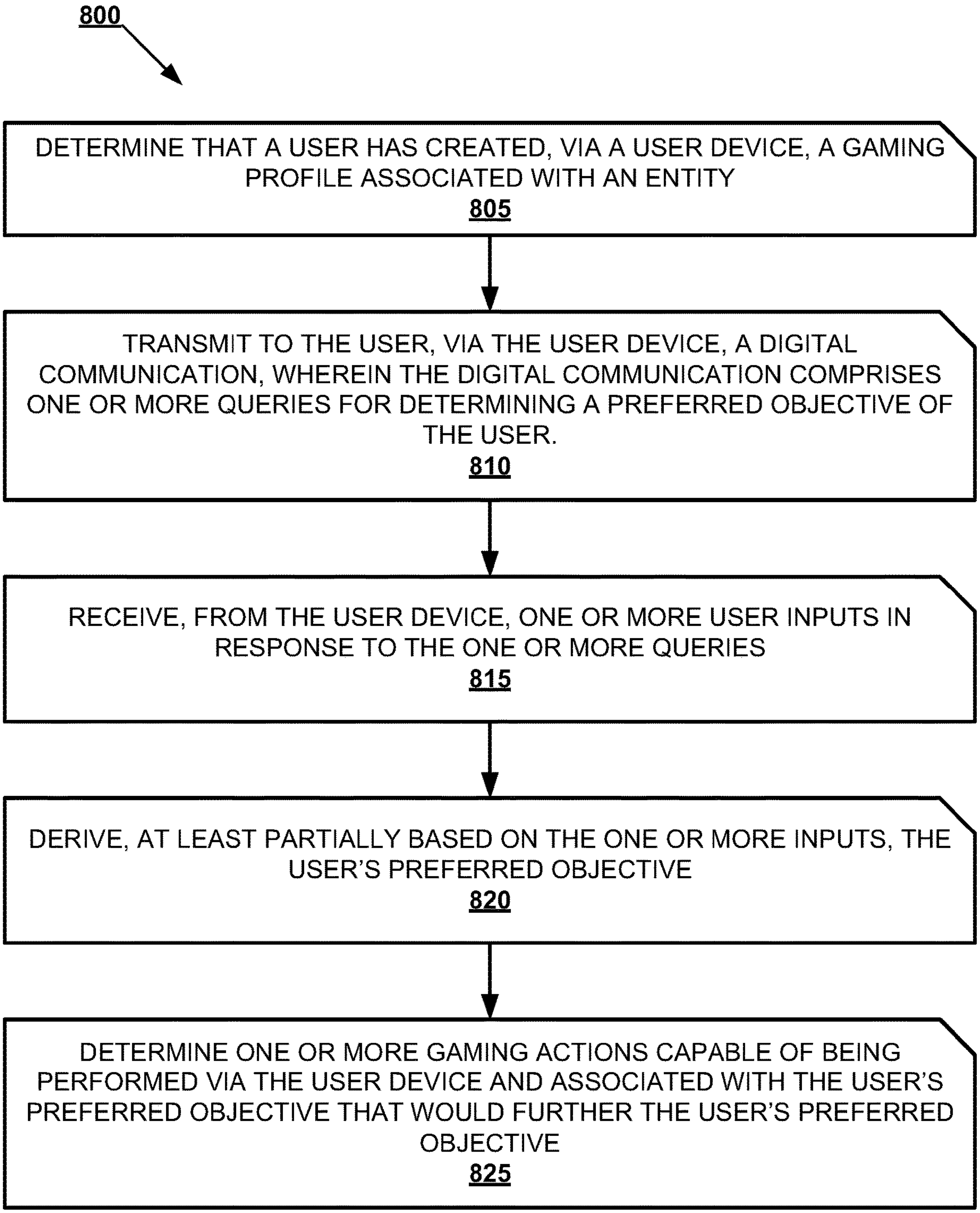
FIGS. 9A-9B depict a block diagram of a method for establishing and achieving user objectives through queries.
Figure 9B:
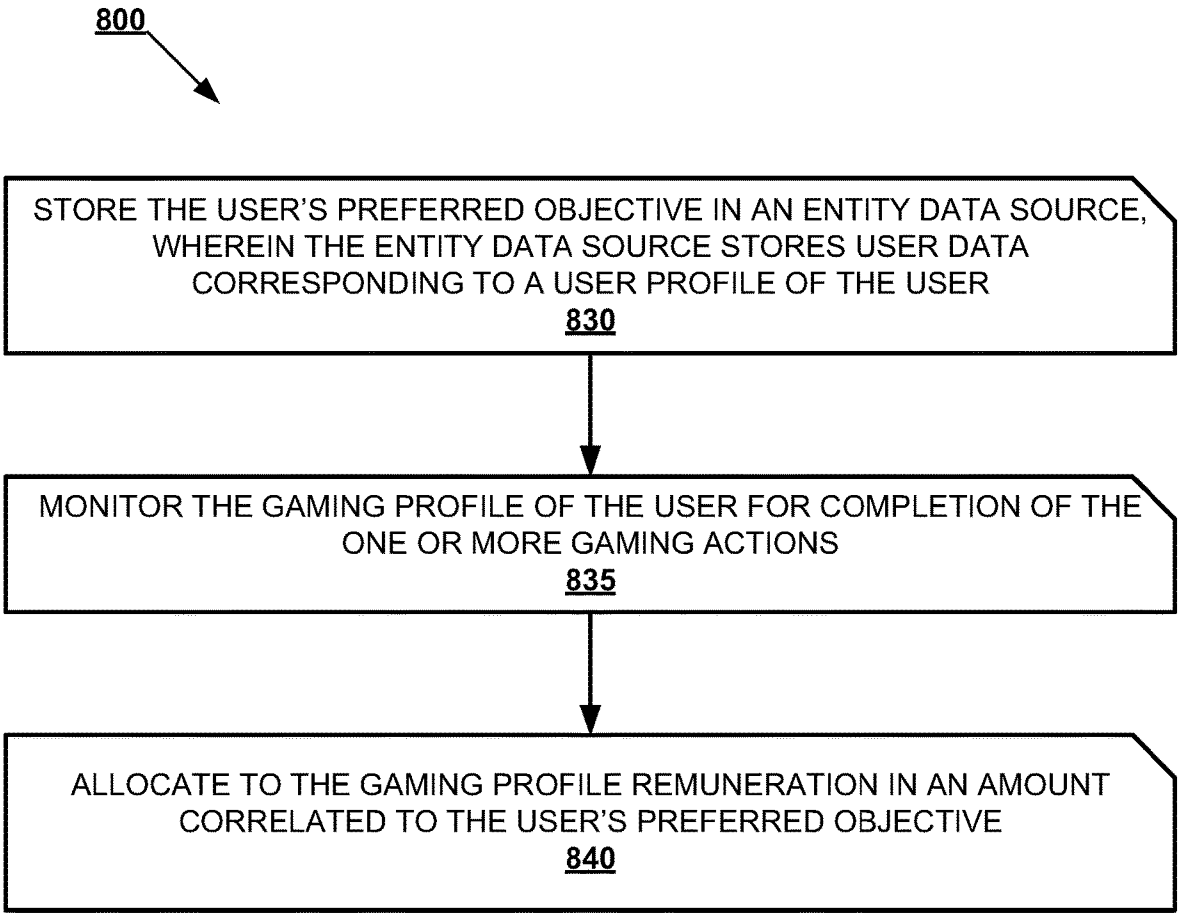

FIGS. 9A-9B depict a block diagram of a method 800 for establishing and achieving objectives using a computer gaming system. The method 800 is performed when a processor executes executable code. At block 805, the processor determines that a user has accessed, via a user device, a gaming profile associated with an entity. At block 810, the processor transmits to the user, via the user device, a digital communication, wherein the digital communication includes one or more queries for determining a preferred objective of the user. In example embodiments, the one or more queries are prioritized by the system based on predefined rules, which may, in part, be influenced by what is beneficial for the entity (e.g., where the entity is a bank, having the user keep more money deposited with the bank may be prioritized as more beneficial for the bank). In particular embodiments, the user may still input their own user objective and forego completing the quiz, query, or survey sent by the processor. At block 815, the processor receives, from the user device, one or more user inputs in response to the one or more queries.

At block 820, the processor derives, at least partially based on the one or more inputs, the user's preferred objective. In example embodiments, the system uses a decision tree, or tree-like model of decisions and their possible consequences, to determine and identify what is important for the user based on the user inputs or answers to the one or more queries in order to direct recommended goals to the user based on the user's personal needs or current life situations (e.g., retirement, emergency fund, children's education, etc.). In various embodiments, based on what the system determines as best for the user, the processor sets up an action plan, including goals and subgoals, to help the user achieve their goal. The various decision trees may be organized by the particular goal (i.e., emergency fund planning, increasing credit score, retirement planning, purchasing goals, financial saving goals, etc.). Example decision trees are outlined below, showing the various branches and nodes that may be applicable for an entity such as a financial intuition. In example embodiments, the decision tree uses machine learning and decision analysis to classify and predict outcomes based on input data, for example, the data input by the user in response to the query.

a. Emergency Fund Planning
  i. Determine target amount
    1. Calculate 3 to 6 months' worth of essential expenses
  ii. Open dedicated account
    1. Set up a separate savings or money market account
  iii. Automate contributions
    1. Set up automatic transfers from paycheck or bank account
  iv. Prioritize consistency
    1. Regularly contribute a portion of income
  v. Emergency fund only for emergencies
    1. Define what constitutes an emergency
  vi. Replenish after use
    1. Rebuild fund after withdrawals
  vii. Adjust for life changes
    1. Update fund size based on changes in expenses
  viii. Monitor and reevaluate
    1. Periodically review fund size and contributions
b. Increasing Credit Score
  i. Check credit report
    1. Obtain free annual credit reports
    2. Review for errors or inaccuracies
  ii. Payment history
    1. Pay bills on time
    2. Set up payment reminders
  iii. Credit utilization
    1. Keep credit card balances low
    2. Avoid maxing out credit cards
  iv. Length of credit history
    1. Keep old accounts open
    2. Avoid opening too many new accounts
  v. Types of credit
    1. Have a mix of credit types (credit cards, loans)
    2. But only apply for credit you need
  vi. New credit inquiries
    1. Minimize opening new accounts
    2. Multiple inquiries can temporarily lower score
  vii. Dealing with debt
    1. Create a repayment plan
    2. Consider debt consolidation
  viii. Good financial habits
    1. Budgeting
    2. Building an emergency fund
  ix. Credit building tools
    1. Consider a secured credit card
    2. Become an authorized user
  x. Patience and persistence
    1. Building credit takes time
    2. Monitor progress regularly
c. Retirement Planning
  i. Assessment and goals
    1. Estimate retirement age
    2. Determine desired lifestyle
  ii. Financial preparedness
    1. Calculate current savings
    2. Estimate future expenses
    3. Consider inflation
  iii. Savings strategies
    1. Determine monthly contribution
    2. Explore retirement accounts (401(k), ira, etc.)
    3. Investment allocation
  iv. Healthcare and insurance
    1. Research medicare/medicaid
    2. Evaluate long-term care insurance v. Debt management
  1. Pay off debts before retirement
vi. Social security
  1. Understand benefits and eligibility
  2. Decide when to start benefits
vii. Estate planning
  1. Create or update will
  2. Designate beneficiaries
viii. Monitoring and adjustments
  1. Regularly review progress
  2. Make adjustments based on life changes d. Purchasing Goals
  i. Type of purchase
    1. Everyday items
    2. Big-ticket items
    3. Investments
    4. Entertainment
  ii. Everyday items
    1. Groceries
    2. Clothing
    3. Household supplies
  iii. Big-ticket items
    1. Vehicles
    2. Electronics
    3. Furniture
    4. Wedding
  iv. Investments
    1. Stocks
    2. Real estate
    3. Precious metals
  v. Entertainment
    1. Vacation/Traveling
    2. Concerts
    3. Events e. Financial Savings Goals
  i. Short-term goals
    1. Emergency fund
    2. Vacation
    3. Electronics purchase
  ii. Medium-term goals
    1. Down payment for a house
    2. Higher education
  iii. Long-term goals
    1. Retirement
    2. Children's education
    3. Financial independence Similar to the predetermined financial goals method discussed with reference to FIG. 8, at block 825, the system determines one or more gaming actions capable of being performed via the user device and associated with the user's preferred objective that would further the user's preferred objective. In particular embodiments, the user's preferred objective may include a first step and a second step, wherein the second step has a higher remuneration amount than the first step for when the system allocates the remuneration to the user. In various embodiments, the user's preferred objective includes a series of steps to complete the one or more gaming actions. For example, the processor may receive an indication from the user device that the user has completed each of the series of steps and determine that the user has achieved the user's preferred objective.

At block 830, the system stores the user's preferred objective in an entity data source, wherein the entity data source stores user data corresponding to a user profile of the user. at block 835, the processor monitors the gaming profile of the user for completion of the one or more gaming actions. In response to receiving an indication or the system determining that the user has completed the one or more gaming actions, at block 840, the processor allocates to the gaming profile remuneration in an amount correlated to the user's preferred objective.

Machine Learning Financial Goals

Figure 10A:
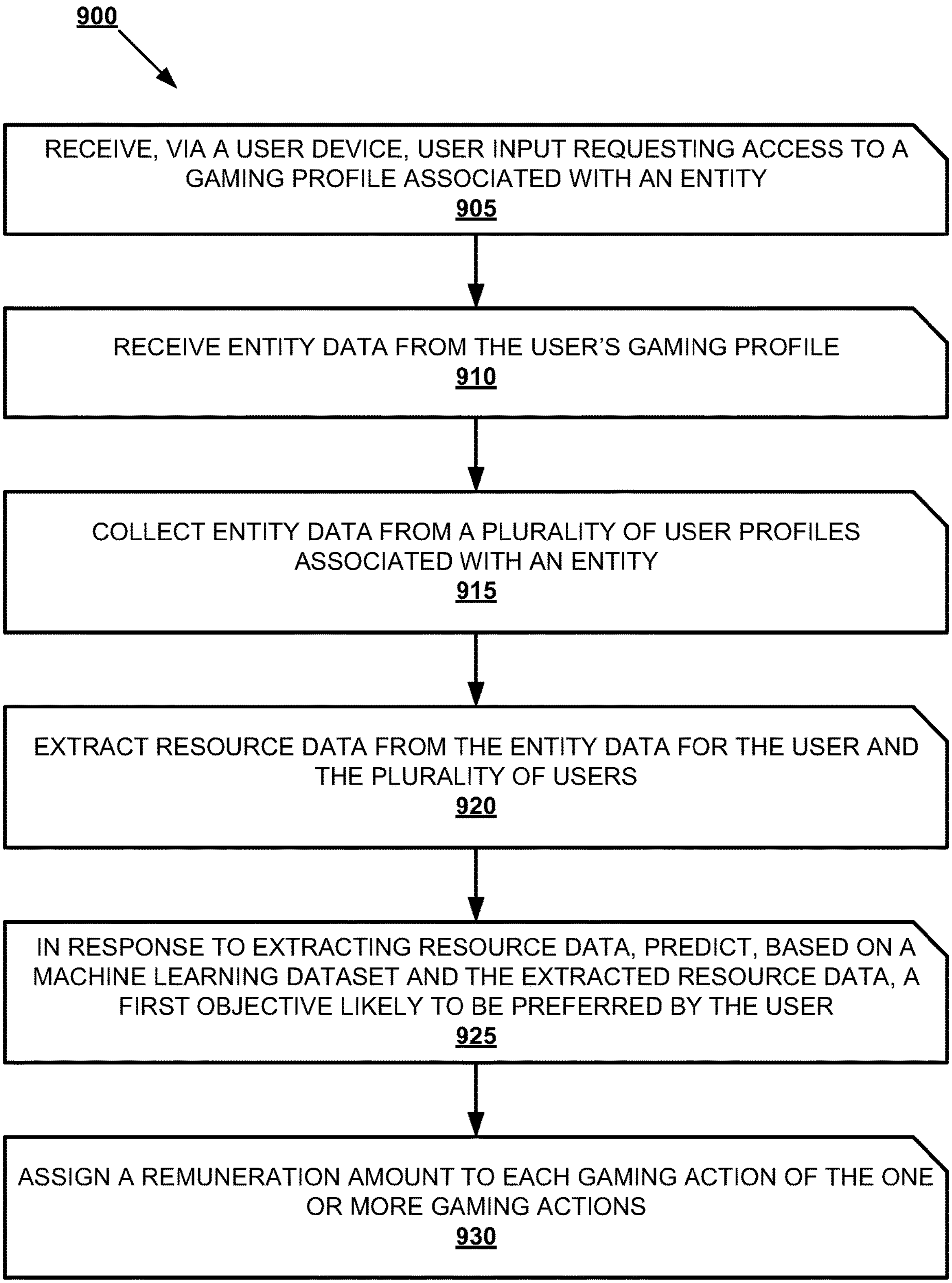

FIGS. 10A-10B depict a block diagram of a method 900 for establishing and achieving objectives using a computer gaming system. The method 900 is performed when a processor executes executable code. At block 905, the system receives, via a user device, user input requesting access to a gaming profile associated with an entity.

At block 910, the system receives entity data from the user's gaming profile. At block 915, the system collects entity data from a plurality of user profiles associated with an entity. In example embodiments, the plurality of users that the system collects user profile entity data from are other users of the gaming software application, other customers associated with the entity, or users that have provided their data on a public forum. In some embodiments, the data collected may include any publicly available information. As discussed above, the entity data for the user and the plurality of users may include information about current resources, spending habits, and other account data information such as the user's age, whether the user has any dependents, the user's marital status, the number and type of accounts or products/services the user has or utilizes with the entity, etc.

At block 920, the system extracts resource data from the entity data for the user and the plurality of users. In example embodiments, the extracted resource data includes real-world currencies currently held by the user and/or plurality of users within an account associated with the user and/or plurality of users at the entity, where the entity is a financial institute. In alternate embodiments, the resources extracted may include the types of account the user and/or plurality of users have with the entity. In still other embodiments, the extracted resources may delve deeper into the user's and/or plurality of users' personal financial and/or life situations.

At block 925, in response to extracting resource data, the system predicts, based on a machine learning dataset and the extracted resource data, a first objective likely to be preferred by the user. The machine learning dataset may be based on historical data related to information that would identify a user. In some embodiments, the machine learning dataset may include information relating to features or systems that the user or plurality of users have accessed. In example embodiments, the machine learning dataset may include data from a plurality of sources, or one or more machine learning algorithms may be used to generate the machine learning datasets. Such machine learning algorithms may include supervised learning algorithms, unsupervised algorithms, regression algorithms, instance based algorithms, regularization algorithms, decision tree algorithms, Bayesian algorithms, clustering algorithms, artificial neural network algorithms, etc.

In particular embodiments, the machine learning dataset may include information relating to patterns, sequences, ebbs and flows of user activity, and other details that do not necessarily contain financial information, but rather relate to a user's behavior. The machine learning dataset, in some embodiments, may also include other information related to the user and/or entity, or to other factors including geographic data, Internet search history, search history habits, etc. With regard to machine learning datasets pertinent to predicting an entity's preferred objective, the information may include worldly events such as elections, wars, stocks, the housing market, etc. With the gathering of all this information to build the machine learning dataset, the system is better able to predict the first objective likely to be preferred by the user and/or the entity.

At block 930, the system assigns a remuneration amount to each gaming action of the one or more gaming actions. At block 935, based on the predicted first objective likely to be preferred by the user, the system determines one or more gaming actions capable of being performed via the user device and associated with the gaming profile that would further the first objective likely to be preferred by the user. At block 940, the system assigns a remuneration amount to each gaming action of the one or more gaming actions. In particular embodiments, the system may assign a lesser remuneration for an easier gaming action and the remuneration may increase as the difficulty of the gaming actions increases.

At block 945, the system monitors the gaming profile of the user and/or tracks the user's progress for completion of the one or more gaming actions. Based on the determination that the user has completed the one or more gaming actions, the system allocates to the gaming profile remuneration in the amount assigned to the one or more gaming actions completed by the user. In some embodiments, it may be required for the user to complete all gaming actions created by the system for the user before the system allocates the remuneration. In alternate embodiments, the user may receive incremental remuneration along the way as they complete various gaming actions. In still other embodiments, the system may allocate incremental remuneration to the user as the user creates each gaming action, and then award a larger remuneration based on completion of all gaming actions by the user.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A computer gaming system for establishing and achieving objectives, the computer system comprising:

- at least one processor;
- a communication interface communicatively coupled to the at least one processor; and
- a memory device storing executable code that, when executed, causes the processor to:
  - determine that a user has created, via a user device, a gaming profile associated with an entity;
  - display one or more user objectives via the user device;
  - receive, via the user device, a user selection of at least one user objective from the one or more user objectives;
  - create a gaming action capable of being performed via the user device that would permit a user to achieve the at least one user objective;
  - receive an indication from the user device that the user has achieved the at least one user objective; and
  - transmit to the gaming profile a digital remuneration in an amount correlated to the at least one user objective achieved by the user.

2. The computer system of claim 1, wherein the one or more user objectives comprise one or more universal objectives correlated to one or more basic financial skills.

3. The computer system of claim 2, wherein the one or more basic financial skills comprise at least one of saving, purchasing, retiring, increasing credit score, and funding for an emergency.

4. The computer system of claim 1, wherein the one or more user objectives comprises a selection of predetermined objectives.

5. The computer system of claim 1, wherein the one or more user objectives comprises at least one custom user objective received from the user device.

6. The computer system of claim 1, wherein the one or more user objectives comprise a goal that is mutually beneficial to the user and to the entity.

7. The computer system of claim 6, wherein the mutually beneficial goal is at least one of increasing user savings, increasing user engagement, promoting cross-selling with partner entities, promoting fiscal learning, borrowing facility initiation, and increasing user retention.

8. The computer system of claim 1, wherein the at least one user objective comprises a series of steps, wherein based at least in part on receiving an indication from the user device that the user has completed each of the series of steps, the code, when executed, receives an indication from the user device that the user has achieved the at least one user objective.

9. A computer-implemented method for establishing and achieving objectives via a computer gaming system, the method comprising

- determining that a user has created, via a user device, a gaming profile associated with an entity;
- displaying one or more user objectives via the user device;
- receiving, via the user device, a user selection of at least one user objective from the one or more user objectives;

creating a gaming action capable of being performed via the user device that would permit a user to achieve the at least one user objective;

receiving an indication from the user device that the user has achieved the at least one user objective; and transmitting to the gaming profile a digital remuneration in an amount correlated to the at least one user objective achieved by the user.

10. The computer system of claim 9, wherein the one or more user objectives comprise one or more universal objectives correlated to one or more basic financial skills.

11. The computer system of claim 10, wherein the one or more basic financial skills comprises at least one of saving, purchasing, retiring, increasing credit score, and funding for an emergency.

12. The computer system of claim 9, wherein the one or more user objectives comprises a selection of predetermined objectives.

13. The computer system of claim 9, wherein the one or more user objectives comprises at least one custom user objective received from the user device.

14. The computer system of claim 9, wherein the one or more user objectives comprise a goal that is mutually beneficial to the user and to the entity.

15. The computer system of claim 14, wherein the mutually beneficial goal is at least one of increasing user savings, increasing user engagement, promoting cross-selling with partner entities, promoting fiscal learning, borrowing facility initiation, and increasing user retention.

16. A computer system for establishing and achieving objectives via a gaming software application, the computer system comprising:

at least one processor;

a communication interface communicatively coupled to the at least one processor; and a memory device storing executable code that, when executed, causes the processor to:

receive, via a user device, a user gaming profile of a user for the gaming software application, wherein the gaming software application is associated with an entity;

transmit, via the user device, a first user objective and a second user objective to the user;

receive, via the user device, a user selection of at least one of the first user objective and the second user objective;

create a set of gaming actions capable of being performed via the user device that would permit a user to achieve at least one of the first user objective and the second user objective;

track the user's progress towards performing the set of gaming actions;

determine that the user has completed performance of the set of gaming actions; and transmit to the user gaming profile a digital remuneration in an amount correlated to at least one of the first user objective and the second user objective.

17. The computer system of claim 16, wherein the digital remuneration is capable of being exchanged for legal tender.

18. The computer system of claim 17, wherein the code, when executed, further causes the processor to:

receive, via the user device, a request to exchange the digital remuneration for legal tender;

convert the digital remuneration into legal tender; and transmit the legal tender to a user account of the user, wherein the user account is associated with the entity.

19. The computer system of claim 16, wherein the first user objective comprises at least one basic financial skills.

20. The computer system of claim 19, wherein the at least one basic financial skill comprises at least one of saving, purchasing, retiring, increasing credit score, and funding for an emergency.

* * * * *